(12) United States Patent
Arase et al.

(10) Patent No.: US 7,391,749 B2
(45) Date of Patent: Jun. 24, 2008

(54) WIRELESS COMMUNICATION TERMINAL METHOD AND RECORDING MEDIUM CAPABLE OF ESTABLISHING BOTH SYNCHRONOUS OR ASYNCHRONOUS COMMUNICATION LINKS DEPENDING ON SIGNAL QUALITY

(75) Inventors: Yoshitaka Arase, Otake (JP); Masaaki Morioka, Higashihiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 634 days.

(21) Appl. No.: 10/515,268

(22) PCT Filed: Sep. 18, 2003

(86) PCT No.: PCT/JP03/11866

§ 371 (c)(1),
(2), (4) Date: Nov. 22, 2004

(87) PCT Pub. No.: WO2004/034722

PCT Pub. Date: Apr. 22, 2004

(65) Prior Publication Data

US 2006/0056332 A1 Mar. 16, 2006

(30) Foreign Application Priority Data

Oct. 10, 2002 (JP) ............................. 2002-297622

(51) Int. Cl.
*H04J 1/16* (2006.01)
*H04J 3/16* (2006.01)
*H04Q 7/20* (2006.01)

(52) U.S. Cl. ...................... 370/329; 370/468; 455/452.2

(58) Field of Classification Search ................ 370/252, 370/329, 335, 336, 342, 343, 344, 345, 465, 370/468; 455/450, 452.2
See application file for complete search history.

(56) References Cited

U.S. PATENT DOCUMENTS 5,935,267 A * 8/1999 Hayakawa ................... 714/748
(Continued)

FOREIGN PATENT DOCUMENTS

JP 2500097 3/1996

OTHER PUBLICATIONS

R. Kapoor et al., "Bluetooth: Carrying Voice ACL Links", Conference Proceedings, Sep. 9, 2002, pp. 379-383, XP010611878, pp. 379-380.

(Continued)

*Primary Examiner*—Huy D. Vu
*Assistant Examiner*—Nittaya Juntima
(74) *Attorney, Agent, or Firm*—Wenderoth, Lind & Ponack L.L.P.

(57) ABSTRACT

Controlling establishment of a synchronous communication link depending on how the communication band is used, the controlling being applied to a wireless communication terminal which supports both asynchronous communications and synchronous communications. A asynchronous communication link management section manages the presence of asynchronous communication links between wireless communication terminals. A synchronous communication link management section manages the presence/status of synchronous communication links between wireless communication terminals. When a request to establish a new synchronous communication link is made by a user, a link establishment determination section determines whether the currently-established asynchronous communication links can be maintained based on the presence/status of the asynchronous and synchronous communication links and the requested communication quality. The link establishment determination section allows the requested synchronous communication link to be established only when it is determined that the currently-established asynchronous communication links can be maintained.

9 Claims, 19 Drawing Sheets

U.S. PATENT DOCUMENTS

| | | | |
|---|---|---|---|
| 6,973,058 B2* | 12/2005 | Paryani | 370/329 |
| 6,973,067 B1* | 12/2005 | Haartsen | 370/337 |
| 2002/0077072 A1* | 6/2002 | Suzuki | 455/180.1 |
| 2002/0131388 A1 | 9/2002 | Ami et al. | |

OTHER PUBLICATIONS

S. Chawla et al., "QoS Based Scheduling for Incorporation Variable Rate Coded Voice in Bluetooth", ICC 2001. 2001 EEE International Conference on Communications. Conference Record. Helsinky, Finland, Jun. 11-14, 2001, IEEE International Conference on Communications, New York, NY: IEEE, US, vol. vol. 1 of 10, Jun. 11, 2001, pp. 1232-1237, XP0105553524, ISBN: 0-7803-7097-1, pp. 1232-1235, left-hand column.

A. Das et al., "Enhancing Performance of Asynchronous Data Traffic Over the Bluetooth Wireless Ad-hoc Network", Proceedings IEEE INFOCOM 2001. The Conference on Computer Communications. 20th Annual Joint Conference of the IEEE Computer and Communications Societies. Anchorage, AK, Apr. 22-26, 2001, Proceedings IEEE INFOCOM. The Conference on Computer Communi, vol. vol. 1 of 3. Conf. 20, Apr. 22, 2001, pp. 591-600, XP010538741, ISBN: 0-7803-7016-3, pp. 591-593, left-hand column, paragraph 4, p. 595, left-hand column, paragraphs 2, 3.

* cited by examiner

FIG. 3

| STATE | | [1] | [2] | [3] | [4] | [5] | [6] | [7] | [8] | [9] | [10] |
|---|---|---|---|---|---|---|---|---|---|---|---|
| ESTABLISHED LINK | MASTER A → SLAVE B : NUMBER OF ASYNC LINKS | 1 | 1 | 1 | 1 | 1 | 1 | 1 | 1 | 1 | 1 |
| | MASTER A → SLAVE B : NUMBER OF SYNC LINKS | | 1 (HV2) | 2 (HV3) | | | | | | | |
| | MASTER A → SLAVE C : NUMBER OF ASYNC LINKS | 0 | 0 | 0 | 1 | 1 | 2 (HV3) | 1 | 1 | 1 | 1 |
| | MASTER A → SLAVE C : NUMBER OF SYNC LINKS | | | | | 1 (HV2) | 1 | 1 (HV2) | 1 (HV3) | 1 (HV3) | 1 (HV3) |
| | MASTER A → SLAVE D : NUMBER OF ASYNC LINKS | 0 | 0 | 0 | 0 | 0 | 0 | 0 | 0 | 2 (HV3) | 1 (HV3) |
| | MASTER A → SLAVE D : NUMBER OF SYNC LINKS | | | | | | | | | | |
| | MASTER A → SLAVE E~I : NUMBER OF ASYNC LINKS | 1~5 | 1~5 | 1~5 | 1~4 | 1~4 | 1~4 | 1~4 | 1~4 | 1~4 | 1~4 |
| | MASTER A → SLAVE E~I : NUMBER OF SYNC LINKS | | | | | | | | | | |
| NEW LINK TO BE ESTABLISHED | MASTER A → SLAVE B : SYNC LINK PACKET TYPE — HV1 | ● | | | ● | | | | | | |
| | MASTER A → SLAVE B : SYNC LINK PACKET TYPE — HV2 | | ● | | | ● | | ● | | | |
| | MASTER A → SLAVE B : SYNC LINK PACKET TYPE — HV3 | | | ● | | | ● | | ● | ● | ● |

● : PACKET TYPE WHICH, IF USED FOR NEWLY-ESTABLISHED SYNC LINK, RESULTS IN DISRUPTION OF THOSE ASYNC LINKS WHICH ARE SHOWN HATCHED

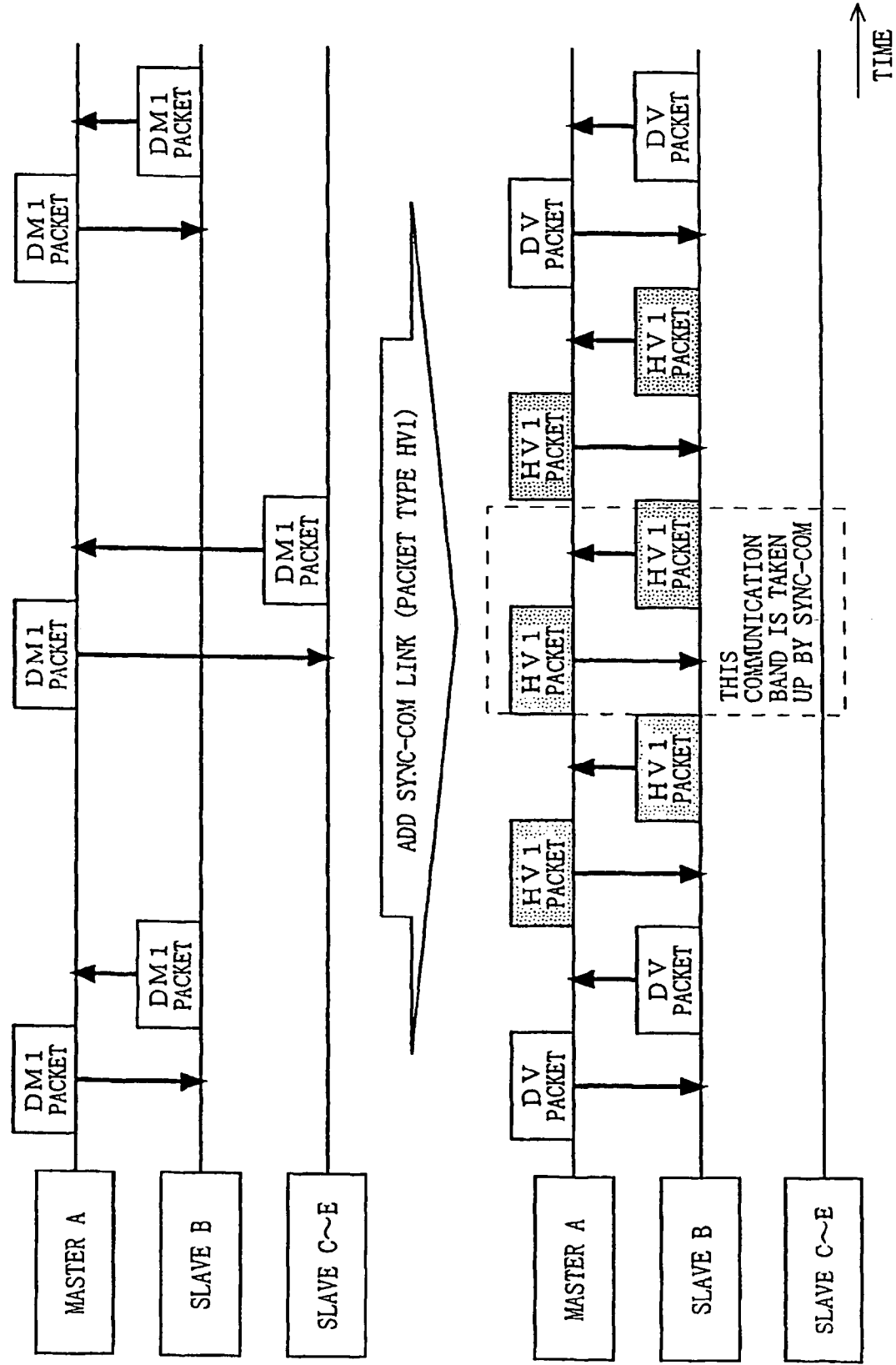

US 7,391,749 B2

WIRELESS COMMUNICATION TERMINAL METHOD AND RECORDING MEDIUM CAPABLE OF ESTABLISHING BOTH SYNCHRONOUS OR ASYNCHRONOUS COMMUNICATION LINKS DEPENDING ON SIGNAL QUALITY

BACKGROUND OF THE INVENTION

1. Field of the Invention

The present invention relates to a wireless communication terminal for performing the establishment of a communication link, a method therefor, a program for executing the method, and a recording medium containing the program. More particularly, the present invention relates to a wireless communication terminal which supports both synchronous communications and asynchronous communications, and is capable of concurrently establishing a plurality of communication links with a plurality of other wireless communication terminals, a method for establishing such communication links, a program for executing the method, and a recording medium having the program recorded thereon.

2. Description of the Related Art

As is well known, communication terminals, e.g., PDA (Personal Digital Assistants), cellular phones, or personal computers, can realize various functions such as an internet connection, LAN (Local Area Network) access, exchange of business card data, telephone calling, music reproduction, and the like. These functions are realized through either asynchronous (ASYNC) communications (which are chiefly used for data transmissions which do not require real time capabilities), or synchronous (SYNC) communications (which are chiefly used for data transmissions which require real time capabilities). Generally speaking, internet connection, LAN access (data communications, file transmission), and exchange of business card data (file transfer) are realized through asynchronous communications. On the other hand, telephone calling (audio communications) and music reproduction (audio communications) are generally realized through synchronous communications.

In recent years, communication terminals are being used in more and more diversified manners. In one manner, a plurality of functions may be simultaneously executed. Examples of functions that can be simultaneously executed are: functions using the same communication mode, such as performing an exchange of business card data during an internet connection (both of which are asynchronous communications), or making telephone calls while listening to music (both of which are synchronous communications); and functions using different communication modes, such as making telephone calls during LAN access (i.e., an asynchronous communication and a synchronous communication).

In the field of wired communications, the IEEE1394 standard or the like already enables communications which involve such simultaneous use of a plurality of functions, i.e., communications involving both asynchronous communications and synchronous communications. In the field of wireless communications, a technique supporting both asynchronous communications and synchronous communications already exists. However, this technique only enables execution of either asynchronous communications or synchronous communications (referred to as "single link communications"), rather than enabling simultaneous execution of asynchronous communications and synchronous communications (referred to as "multi link communications"). Therefore, efforts have been made to develop techniques for realizing simultaneous execution of asynchronous communications and synchronous communications in the field of wireless communications. One example of such a technique is the Bluetooth™ communication standard. For details of Bluetooth communications, see Kazuhiro Miyatsu, "Technology Kaitaishinsho Bluetooth Gijutsu Guide", 1st ed., Ric Telecom, Ltd., Jun. 11, 2001.

Hereinafter, a technique for simultaneously executing asynchronous communications and synchronous communications will be described with respect to a control module for Bluetooth communications. FIG. 14 is a block diagram illustrating a schematic structure of a conventional wireless communication terminal incorporating a control module for Bluetooth communications.

In FIG. 14, the conventional wireless communication terminal comprises a user input section 110, a link management section 120, communication processing section 130, wireless communication section 140, specific function processing section 150, and a display section 160. The link management section 120 includes an asynchronous communication link management section 121, a synchronous communication link management section 122, an asynchronous communication link control section 123, and a synchronous communication link control section 124.

The user input section 110 receives, from a user, an instruction concerning functions of the wireless communication terminal (begin data transfer, begin download, establish a communication link, etc.), and issues, to the link management section 120, an instruction to establish a communication link, and issues other instructions to the specific function processing section 150.

Hereinafter, the largest number of synchronous (or asynchronous) communication links which can be simultaneously established with other wireless communication terminals will be referred to as the "limit number concerning synchronous (or asynchronous) communication links". Moreover, the number of synchronous (or asynchronous) communication links which have already been established with other wireless communication terminals will be referred to as the "established number concerning synchronous (or asynchronous) communication links".

The asynchronous communication link management section 121 retains a limit number and an establish number concerning asynchronous communication links, and based on these numbers, determines whether it is possible to establish an asynchronous communication link which has been designated by the user. The synchronous communication link management section 122 retains a limit number and an established number concerning synchronous communication links, and based on these numbers, determines whether it is possible to establish a synchronous communication link which has been designated by the user. Upon receiving an instruction to establish an asynchronous communication link from the asynchronous communication link management section 121, the asynchronous communication link control section 123 establishes an asynchronous communication link with a corresponding wireless communication terminal by means of the communication processing section 130 and the wireless communication section 140. Upon receiving an instruction to establish a synchronous communication link from the synchronous communication link management section 122, the synchronous communication link control section 124 establishes a synchronous communication link with a corresponding wireless communication terminal by means of the communication processing section 130 and the wireless communication section 140.

The communication processing section 130 performs a process of establishing a communication link and a process instructed by the specific function processing section 150.

The wireless communication section 140 carries out a wireless communication with another wireless communication terminal. The specific function processing section 150 is a section which processes functions that are specific to the wireless communication terminal. The display section 160 displays various information related to the wireless communication terminal.

Based on the above structure, the conventional wireless communication terminal realizes not only simultaneous establishment of a plurality of asynchronous communication links or simultaneous establishment of a plurality of synchronous communication links, but also realizes simultaneous establishment of an asynchronous communication link and a synchronous communication link.

An example of a conventional technique related to concurrent establishment of asynchronous communication links is disclosed in the specification of, e.g., Japanese Patent No. 2500097, which relates to adding an asynchronous communication link in a packet communication network. According to this conventional technique, the resource for establishing an asynchronous communication link (average bit rate, deviation of average bit rate, and bandwidth) is checked with respect to each exchange node. If an exchange node has sufficient resource, establishment of an asynchronous communication link is permitted, and if an exchange node does not have sufficient resource, establishment of an asynchronous communication is denied.

The conventional wireless communication terminal having the aforementioned structure carries out the asynchronous communication link management and the synchronous communication link management in independent manners, i.e., without giving consideration to how each other link is established. Therefore, if a request for establishing a synchronous communication link is made when an asynchronous communication link is already established, the conventional wireless communication terminal will establish a synchronous communication link without determining how an asynchronous communication is established (FIG. 15). Since synchronous communications are generally given precedence over asynchronous communications, a problem may occur in the communications in that an already-established asynchronous communication link may be disrupted depending on the communication band (i.e., required communication quality) to be exclusively used by the synchronous communication link which is being established. Note that this problem is unique to wireless communications, where there are limitations on the communication band, and does not pertain to wired communications, which require no particular considerations with respect to the communication band.

The aforementioned problem in wireless communications are illustrated below. FIGS. 16A and 16B are diagrams illustrating an exemplary configuration in which a wireless communication terminal A which functions as a master connected to a public network (a personal computer) establishes a communication link with slave wireless communication terminals B, C, D, and E (cellular phones) FIGS. 17 and 18 are charts illustrating how communication links are established based on a packet type of a different communication quality.

In FIG. 16A, the master wireless communication terminal A has previously established asynchronous communication links with the slave wireless communication terminals B to E for realizing LAN access. In this state, let us assume that the slave wireless communication terminal B newly establishes a synchronous communication link with the master wireless communication terminal A for placing a telephone call via the public network. In this case, the master wireless communication terminal A has not established a synchronous communication link with any of the slave wireless communication terminals B to E, and therefore unconditionally establishes a synchronous communication link with the slave wireless communication terminal B. In general wireless communications, a request for establishing a synchronous communication link contains an instruction concerning the communication band, i.e., communication quality. Therefore, there if no problem if the communication band for the requested synchronous communication link can be secured within a communication band which was unused before the establishment of the synchronous communication link. However, if the communication band for the requested synchronous communication link cannot be secured within the unused communication band, the communication band for the already-established asynchronous communication link is depleted, so that the asynchronous communication link is disrupted (FIG. 16B).

For example, packet types corresponding to communication quality are defined in Bluetooth communications (see pp. 104 and 105 of Bluetooth technology guidelines). An HV1 packet is a packet for a synchronous communication which exclusively uses all of the communication band. An HV2 packet is a packet for a synchronous communication which exclusively uses ½ of the communication band. An HV3 packet is a packet for a synchronous communication which exclusively uses ⅓ of the communication band. A DM1 packet is a packet for a synchronous communications. A DV packet is a packet which, for a synchronous communication link and an asynchronous communication link that are performed between the same pair of wireless communication terminals, can contain both the data of synchronous communication packets (HV1 to HV3) and the data of asynchronous communication packets (DM1) (see p. 106 of the aforementioned Bluetooth guidelines). In Bluetooth communications, there is also a stipulation that a synchronous communication link (HV1 to HV3) can be established after an asynchronous communication link (DM1) is established. Therefore, in the case illustrated in FIG. 16A, there is no problem if a synchronous communication link is requested based on HV2 packets (FIG. 17). On the other hand, if a synchronous communication link is requested based on HV1 packets, there is a problem in that the asynchronous communication links with the slave wireless communication terminals C to E will have to be disrupted (FIG. 18).

Thus, an object of the present invention is to provide a wireless communication terminal which can control the establishment of new synchronous communication links while maintaining already-established a synchronous communication links, a communication link establishment method to be executed by the wireless communication terminal, a program for executing the method, and a recording medium containing the program.

DISCLOSURE OF THE INVENTION

The present invention is directed to a wireless communication terminal having an ability to perform asynchronous communications and perform synchronous communications using different communication bands depending on a communication quality, the wireless communication terminal being capable of concurrently establishing a plurality of communication links with a plurality of other wireless communication terminals. In order to achieve the above objective, the wireless communication terminal comprises an asynchronous communication link management section, a synchronous communication link management section, a link establishment determination section, and a link establishment section.

The asynchronous communication link management section is operable to manage an asynchronous communication band used by an asynchronous communication link which is already established with any other wireless communication terminal. The synchronous communication link management section is operable to manage a synchronous communication band used by a synchronous communication link which is already established with any other wireless communication terminal. The link establishment determination section is operable to determine, in response to a request to establish a new synchronous communication link, whether the new synchronous communication link can be established at a requested communication quality without disrupting the already-established asynchronous communication link, based on the asynchronous communication band and the synchronous communication band. The link establishment section is operable to establish the new synchronous communication link if the link establishment determination section determines that the new synchronous communication link can be established at the requested communication quality.

Depending on the asynchronous communication band and the synchronous communication band, even if a newly requested synchronous communication link cannot be established at the requested communication quality, it may be possible that the newly requested synchronous communication link can be established at another communication quality. In order to address such a situation, if it is determined that the new synchronous communication link cannot be established at the requested communication quality, the link establishment determination section may further determine whether the new synchronous communication link can be established at another communication quality, and the link establishment section may establish the new synchronous communication link at the other communication quality if the link establishment determination section determines that the new synchronous communication link can be established at the other communication quality.

When there exists an already-established synchronous communication link, even if a newly requested synchronous communication link cannot be established at any other communication quality than the requested communication quality, it may be possible that the newly requested synchronous communication link can be established by altering the communication quality of the already-established synchronous communication link. In order to address such a situation, if it is determined that the new synchronous communication link cannot be established at the other communication quality, the link establishment determination section may further determine whether the new synchronous communication link can be established by altering the communication quality of the already-established synchronous communication link. Further, the link establishment section may establish the new synchronous communication link and reestablish the already-established synchronous communication link at an altered communication quality if the link establishment determination section determines that the new synchronous communication link can be established by altering the communication quality of the already-established synchronous communication link.

If it is determined that the new synchronous communication link can be established at a plurality of other communication qualities, the link establishment determination section may present information concerning the plurality of other communication qualities to a user, thereby allowing the user to select one of the plurality of other communication qualities.

If one of a plurality of already-established synchronous communication links is released, the link establishment determination section may determine whether the remaining synchronous communication link or links can be reestablished at a communication quality which is higher than the current communication quality. If the link establishment determination section determines that the remaining synchronous communication link or links can be reestablished at a communication quality which is higher than the current communication quality, the link establishment section may reestablish the remaining synchronous communication link or links at the higher communication quality.

Typically, the communication quality is determined based on a packet type used for each communication link. A plurality of packet types may be available, each occupying a different communication band.

The processes to be performed by the asynchronous communication link control section, the synchronous communication link control section, the link establishment determination section, and the link establishment section of the above-described wireless communication terminal can be regarded as constituting a procedure of a communication link establishment method. The process comprising the steps of: managing an asynchronous communication band used by an asynchronous communication link which is already established with any other wireless communication terminal; managing a synchronous communication band used by a synchronous communication link which is already established with any other wireless communication terminal; determining, in response to a request to establish a new synchronous communication link, whether the new synchronous communication link can be established at a requested communication quality without disrupting the already-established a synchronous communication link, based on the a synchronous communication band and the synchronous communication band; and establishing the new synchronous communication link if it is determined that the new synchronous communication link can be established at the requested communication quality.

Preferably, the communication link establishment method is provided in the form of a program which causes the wireless communication terminal to perform the aforementioned procedure. Such a program may be recorded on a computer-readable recording medium.

Thus, according to the present invention, the presence of asynchronous communication links and the presence/status of synchronous communication links between wireless communication terminals are both considered in determining whether or not to permit a synchronous communication link to be established at a requested communication quality. Thus, even if a request to establish a new synchronous communication link is made, it is ensured that the currently-established asynchronous communication links will always be maintained.

Since the determination as to whether or not to permit a synchronous communication link to be established can be made with respect not only to the requested communication quality but also to a different communication quality, it becomes possible to permit a greater number of synchronous communication links to be established. By presenting information concerning a plurality of such other communication qualities to the user, it becomes possible to control establishment of synchronous communication links in such a manner as to reflect the user's intention.

Furthermore, the communication quality of an already-established synchronous communication link can be dynamically altered, thereby making it possible to permit a greater number of synchronous communication links to be established. Since the communication quality can also be dynamically altered when an existing synchronous communication link is released, it becomes possible to establish a synchronous communication link at as high a communication quality as the communication band allows.

BRIEF DESCRIPTION OF THE DRAWINGS

FIG. 3 is an illustrative table showing exemplary combinations of communication links which may result in the problem of a currently-established asynchronous communication link being disrupted due to a request for establishing a new synchronous communication link;

FIGS. 17 and 18 are charts illustrating problems occurring when packets are transmitted in accordance with the communication sequence shown in FIG. 15.

DETAILED DESCRIPTION OF THE INVENTION

The basic concept of the present invention lies in the controlling of establishment of a newly-requested synchronous communication link without having to disrupt an already-established asynchronous communication link, and involves determining whether or not to permit establishment of such a link and appropriately controlling the communication band for the communication link to be established. The present invention is applicable to any form of wireless communications, regardless of short-range or long-range, where it is possible to establish between wireless communication terminals synchronous communication links using different communication bands depending on the required communication quality. Hereinafter, embodiments of the present invention will be described with respect to the specific example illustrated in the description of the background art (FIG. 16A), where a master wireless communication terminal A, capable of performing Bluetooth communications, establishes communication links with slave wireless communication terminals B, C, D, and E.

First Embodiment

Figure 1:
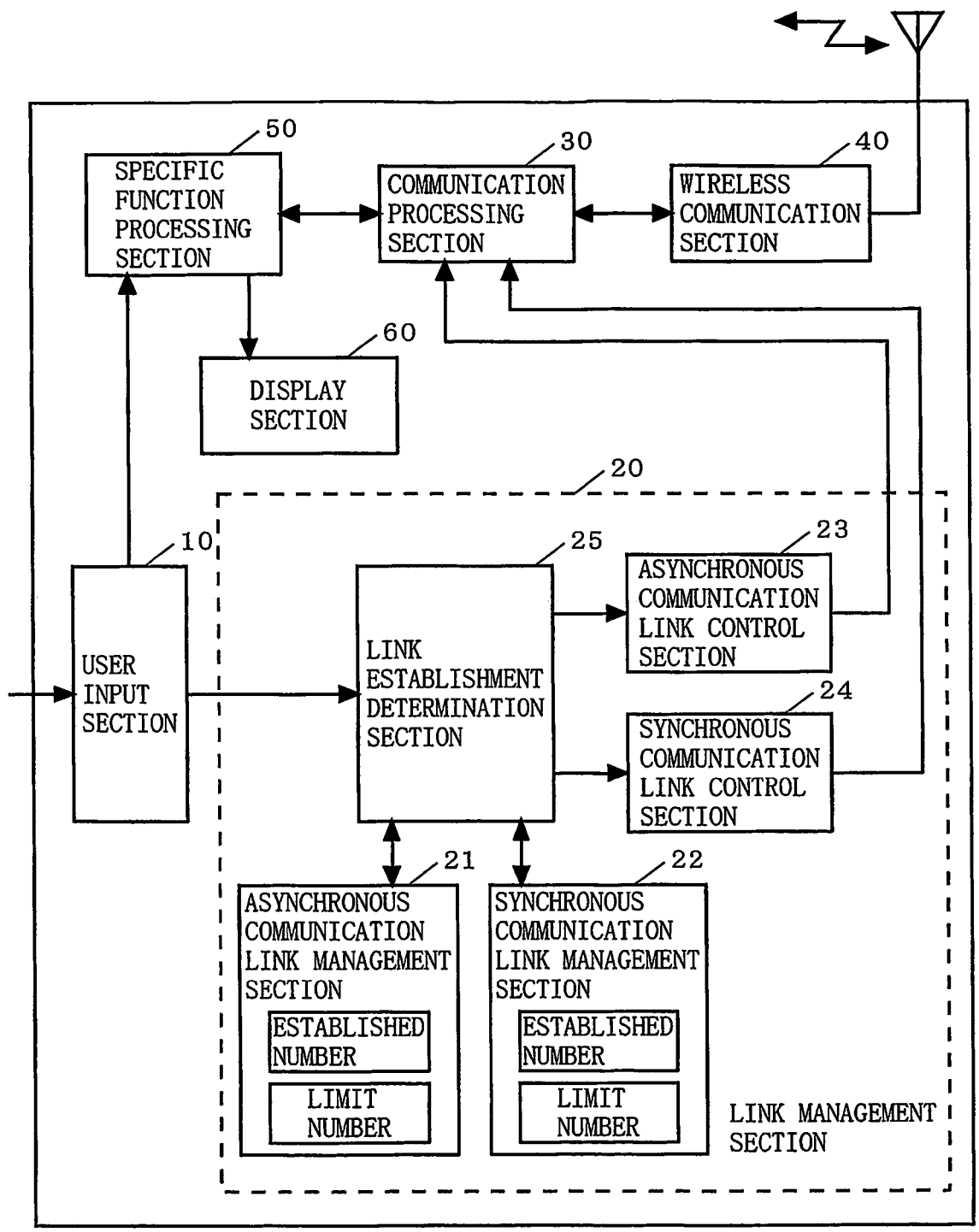
FIG. 1 is a block diagram illustrating a schematic structure of a wireless communication terminal according to first to third embodiments of the present invention.

FIG. 1 is a block diagram illustrating a schematic structure of a wireless communication terminal according to first to third embodiments of the present invention. In FIG. 1, the wireless communication terminal according to the first embodiment comprises a user input section 10, a link management section 20, a communication processing section 30, a wireless communication section 40, a specific function processing section 50, and a display section 60. The link management section 20 includes an asynchronous communication link management section 21, a synchronous communication link management section 22, an asynchronous communication link control section 23, a synchronous communication link control section 24, and a link establishment determination section 25. Based on the structure of the link management section 20 as such, the wireless communication terminal functions as a master terminal.

First, the component elements of the wireless communication terminal according to the present embodiment will be briefly described.

The user input section 10 receives, from a user, an instruction concerning functions of the wireless communication terminal (begin data transfer, begin download, establish communication link, etc.), issues, to the link management section 20, an instruction to establish a communication link, and issues other instructions to the specific function processing section 50. Based on the limit number and the established number (as defined earlier) concerning asynchronous communication links, the asynchronous communication link management section 21 manages the communication band used by any currently-established asynchronous communication link(s). Based on the limit number and the established number (as defined earlier) concerning synchronous communication links, the synchronous communication link management section 22 manages the communication band used by any currently-established synchronous communication link(s).

The link establishment determination section 25 determines whether the currently-established communication link(s) can be maintained even if the newly-requested communication link is established, based on (i) the communication band (currently used by a synchronous communication links) as managed by the a synchronous communication link management section 21, (ii) the communication band (currently used by synchronous communication links) as managed by the synchronous communication link management section 22, and (iii) the communication quality (packet type, etc.) of the synchronous communication link which has been requested to be established. The communication quality may be designated by the user, or a predetermined default value may be used. Based on this determination, the link establishment determination section 25 issues an instruction to establish an asynchronous communication link or a synchronous communication link to the asynchronous communication link control section 23 or the synchronous communication link control section 24, respectively.

In response to the instruction to establish an asynchronous communication link received from the link establishment determination section 25, the asynchronous communication link control section 23 establishes an asynchronous communication link with the relevant wireless communication terminal, by means of the communication processing section 30 and the wireless communication section 40. In response to the instruction to establish a synchronous communication link received from the link establishment determination section 25, the synchronous communication link control section 24 establishes a synchronous communication link with the relevant wireless communication terminal, by means of the communication processing section 30 and the wireless communication section 40. Thus, the asynchronous communication link control section 23, the synchronous communication link control section 24, the communication processing section 30, and the wireless communication section 40 together constitute a link establishment section.

The communication processing section 30 performs a process for establishing a communication link as well as a process as instructed by the specific function processing section 50. The wireless communication section 40 performs wireless communications with other wireless communication terminals. The specific function processing section 50 is a section which processes functions that are specific to the wireless communication terminal. Since the specific function processing section 50 does not constitute an essential portion of the present invention, any detailed description thereof will be omitted. The display section 60 displays various information related to the wireless communication terminal.

Figure 2:
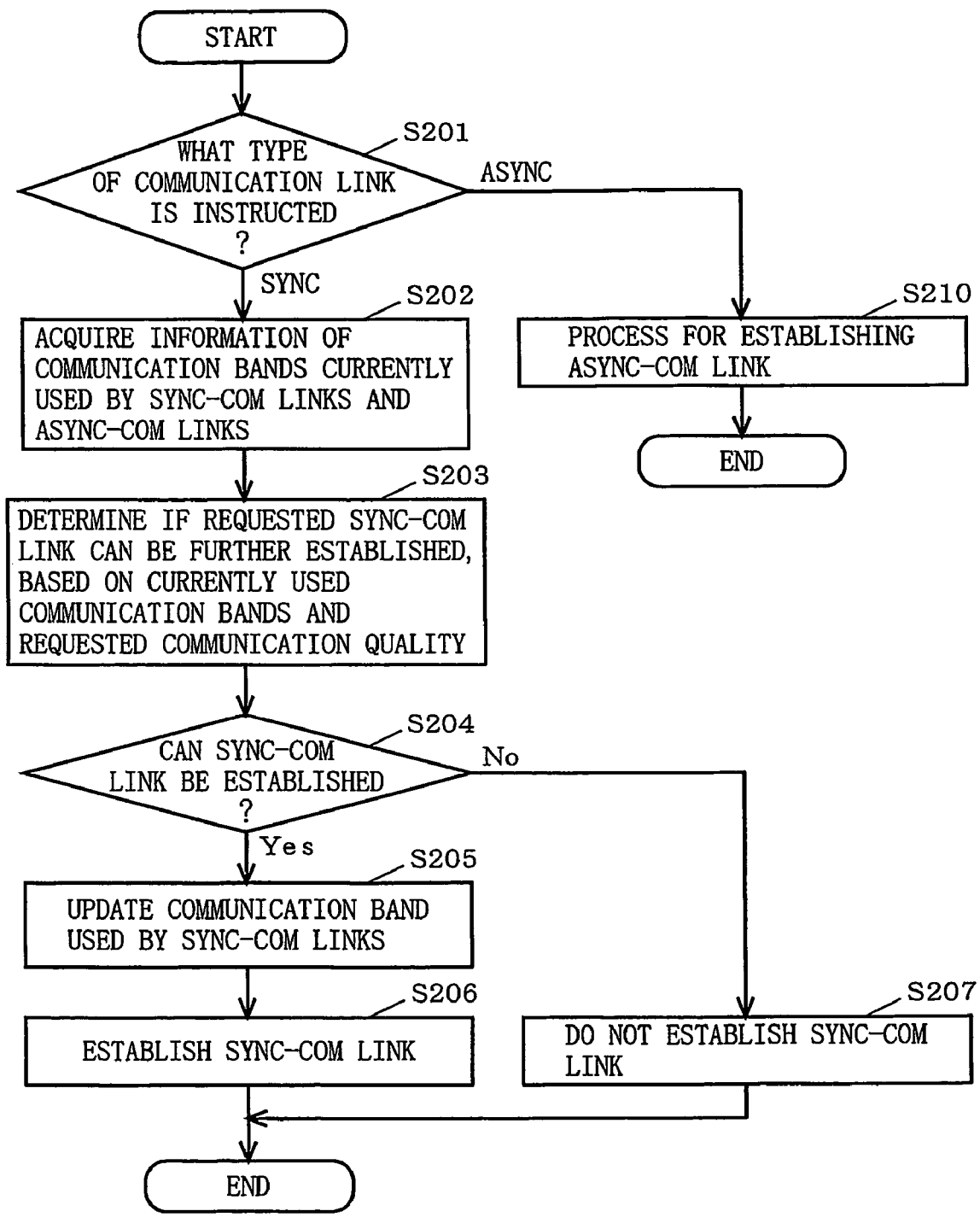
FIG. 2 is a flowchart illustrating the procedure of a communication link establishment method according to the first embodiment of the present invention.

Next, with reference to FIGS. 2 and 3, a communication link establishment method to be performed by the wireless communication terminal according to the first embodiment as described above will be described. FIG. 2 is a flowchart illustrating the procedure of the communication link establishment method according to the first embodiment of the present invention. FIG. 3 is an illustrative table showing exemplary combinations of communication links which may result in the problem of a currently-established asynchronous communication link being disrupted due to a request for establishing a new synchronous communication link, with respect to the configuration illustrated in FIG. 16A. In the illustrative table of FIG. 3, which complies with the Bluetooth standard, a maximum of seven asynchronous communication links alone, a maximum of one synchronous communication link using HV1 packets alone, a maximum of two synchronous communication links using HV2 packets alone, or a maximum of three synchronous communication links using HV3 packets alone, can be concurrently established.

Once an instruction to establish a communication link is inputted by the user (such an instruction containing a communication quality), the user input section 10 determines whether the instructed communication link is an asynchronous communication link or a synchronous communication link (step S201) Then, the user input section 10 issues, to the link establishment determination section 25, a request to establish a communication link which is in accordance with this determination. If the issued request to establish a communication link is directed to an asynchronous communication link, the link establishment determination section 25 performs an establishment process similar to a conventional counterpart (step S210). If the issued request to establish a communication link is directed to a synchronous communication link, the link establishment determination section 25 performs the following establishment process (steps S202 to S207).

Upon receiving, from the user input section 10, a request to establish a synchronous communication link, the link establishment determination section 25 acquires information concerning the communication band currently used by asynchronous communication links from the asynchronous communication link management section 21, and information concerning the communication band currently used by synchronous communication links from the synchronous communication link management section 22 (step S202). Based on the acquired communication bands and the requested communication quality, the link establishment determination section 25 determines whether the newly-requested synchronous communication link can be established while maintaining the currently-established a synchronous communication links (step S203).

Figure 16A:
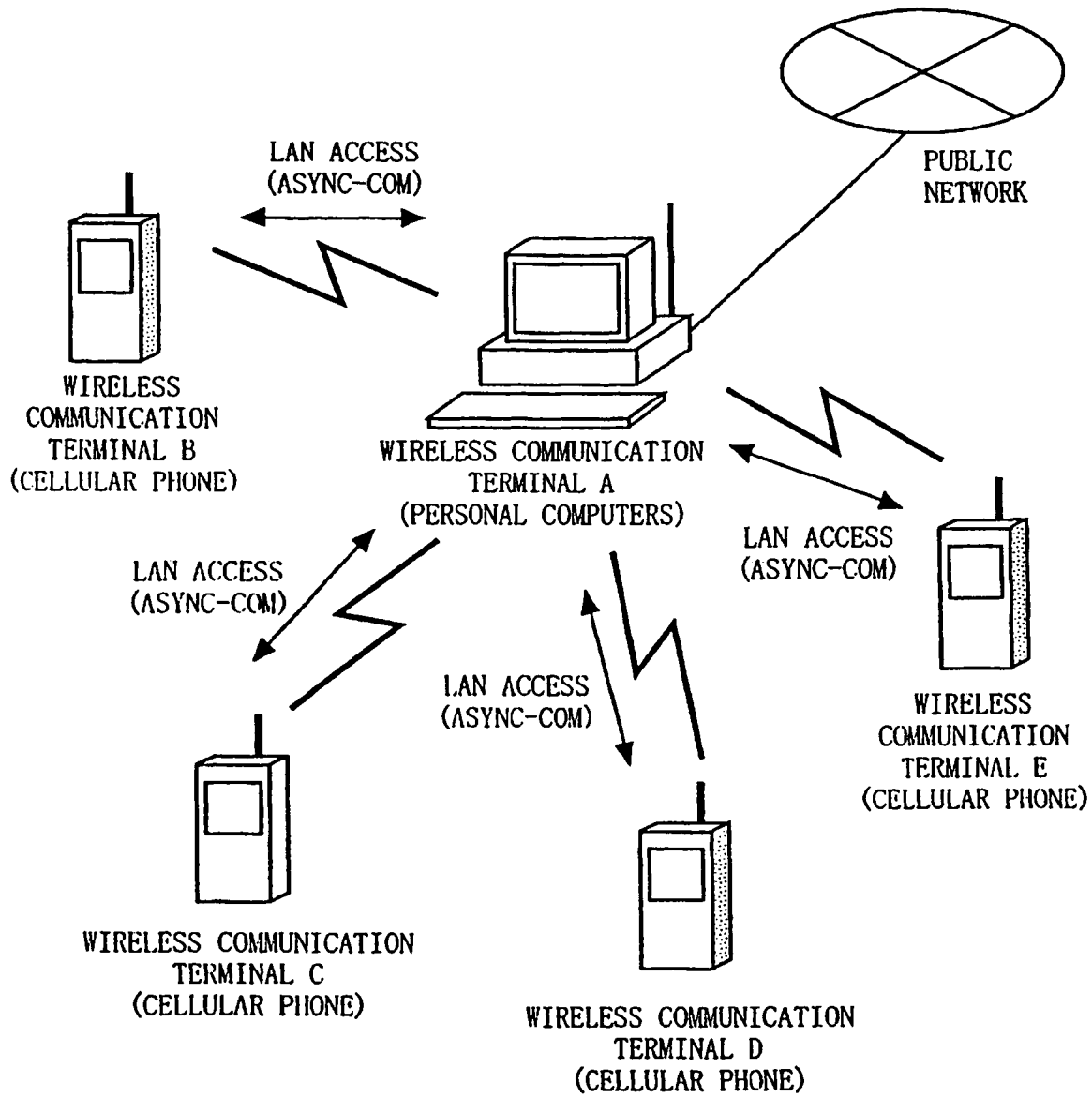
FIGS. 16A and 16B are diagrams illustrating an exemplary configuration for establishing communication links among a plurality of wireless communication terminals.
Figure 16B:
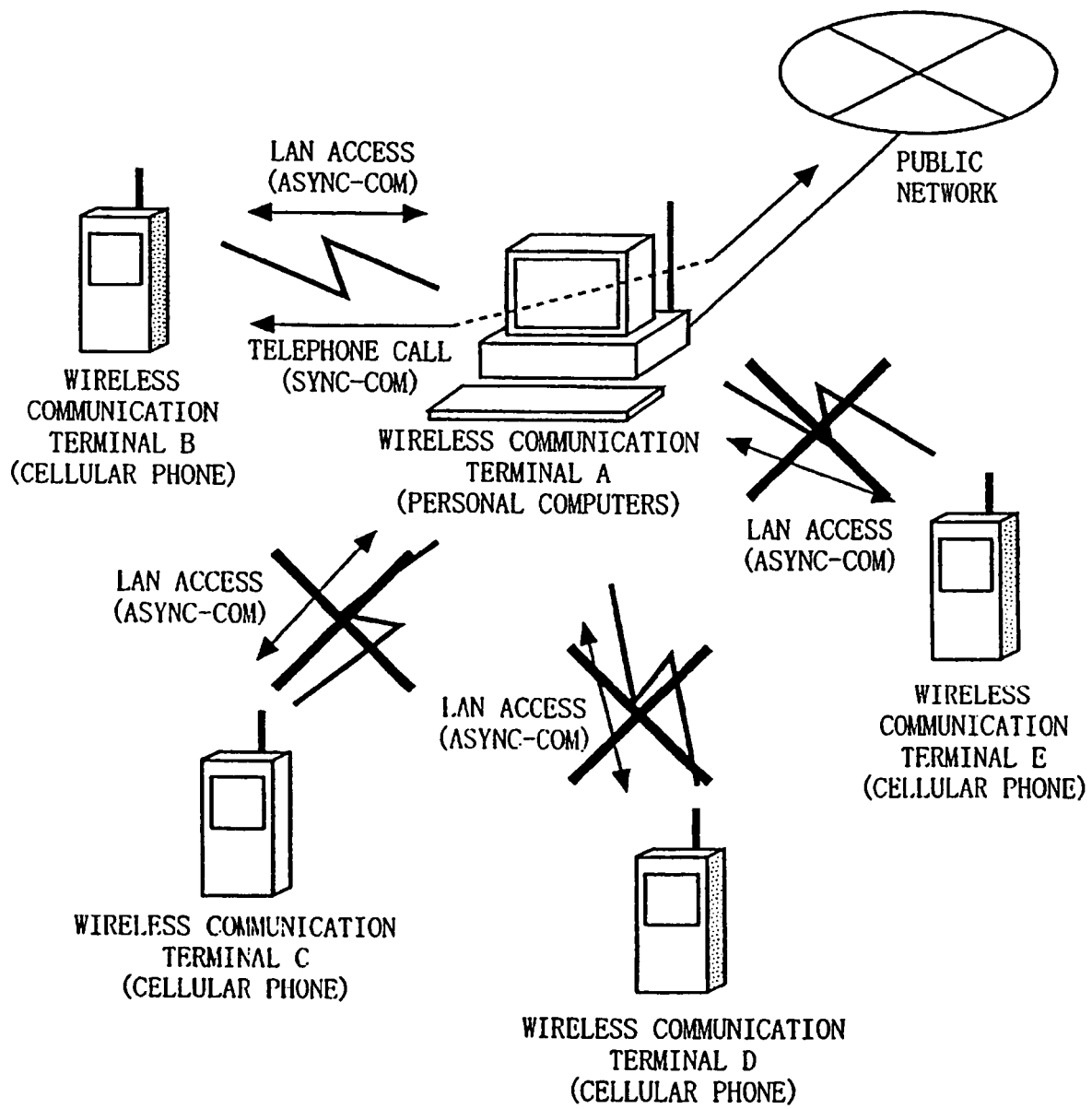
Figure 17:
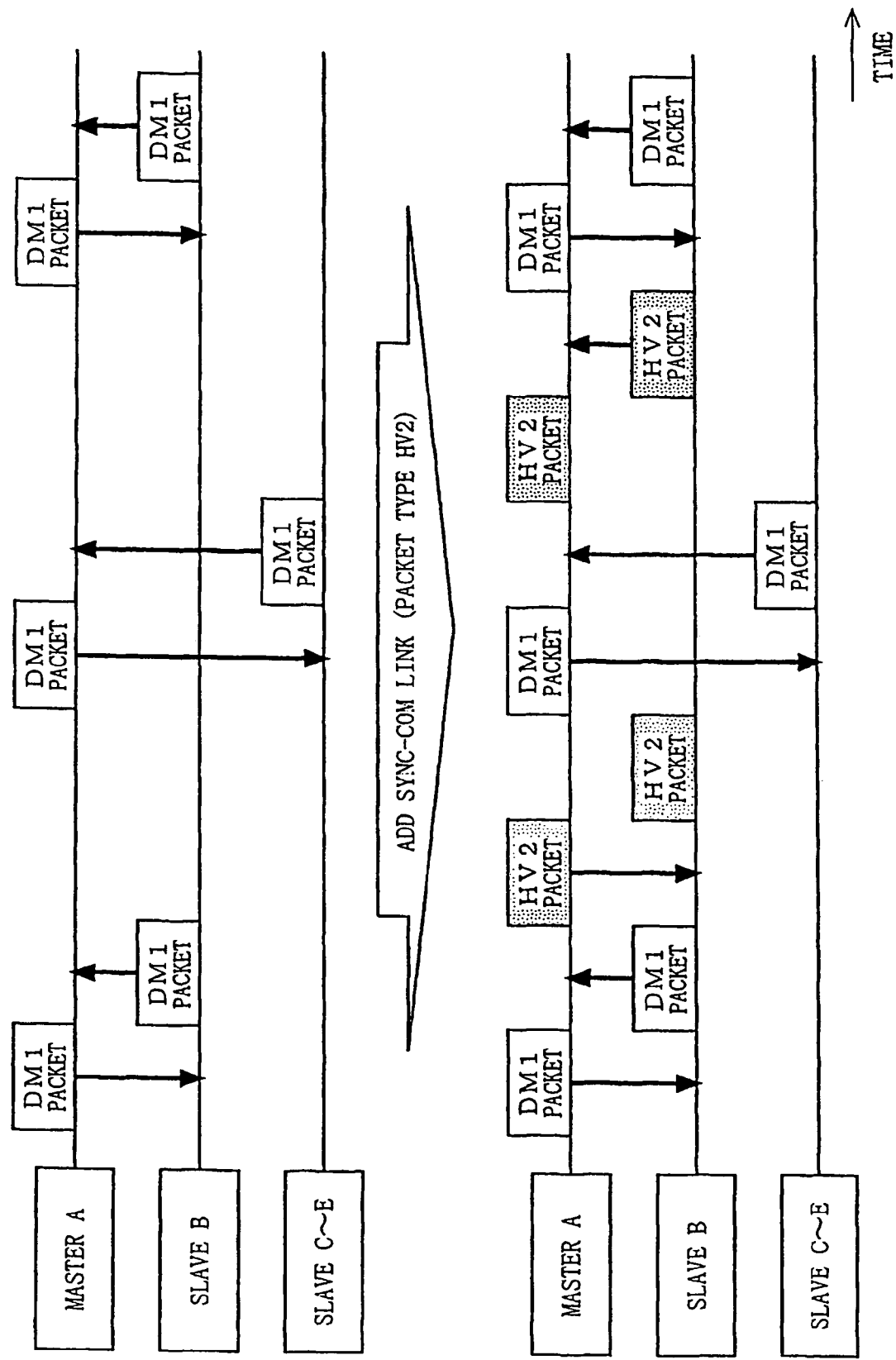

According to the present invention, given the configuration shown in FIG. 16A, the determination performed at step S203 prevents disruption of currently-established asynchronous communication links in Bluetooth communications, under each of the states shown in FIG. 3. Each state illustrated in FIG. 3 will now be described. States [1] and [4] each illustrate a point at which a synchronous communication link based on HV1 packets is to be newly established when no other synchronous communication links have been established. In this case, the entire communication band will be used for this new synchronous communication link (HV1). Therefore, according to the conventional technique, the already-established asynchronous communication links except for the one which is directed to the slave wireless communication terminal B, i.e., the links indicated with hatching, would be disrupted. States [2], [5], and [7] each illustrate a point at which a synchronous communication link based on HV2 packets is to be newly established when one synchronous communication link has already been established based on HV2 packets. In this case, the entire communication band will be used for these two synchronous communication links (HV2). Therefore, according to the conventional technique, the already-established asynchronous communication links except for the one(s) which is/are directed to the slave wireless communication terminal B (and the slave C in state [7]), i.e., the links indicated with hatching, would be disrupted. States [3], [6], and [8] to [10] each illustrate a point at which a synchronous communication link based on HV3 packets is to be newly established when two synchronous communication links have already been established based on HV3 packets. In this case, the entire communication band will be used for these three synchronous communication links (HV3). Therefore, according to the conventional technique, the already-established asynchronous communication links except for the one(s) which is/are directed to the slave wireless communication terminal B (and the slave C in state [8] or [9], and the slave D in state [10]), i.e., the links indicated with hatching, would be disrupted.

If it is determined that the newly-requested synchronous communication link cannot be established (following the "NO" path from step S204), the link establishment determination section 25 ends the process without establishing the requested synchronous communication link (step S207). On the other hand, if it is determined that the newly-requested synchronous communication link can be established (following the "YES" path from step S204), the link establishment determination section 25 instructs the synchronous communication link control section 24 to establish the synchronous communication link. In accordance with the instruction to establish the synchronous communication link, the link establishment determination section 25 updates the communication band, used by synchronous communication links (i.e., the established number), which is managed by the synchronous communication link management section 22 (step S205). Upon receiving the instruction to establish the synchronous communication link, the synchronous communication link control section 24 newly establishes a synchronous communication link (step S206).

Figure 4:
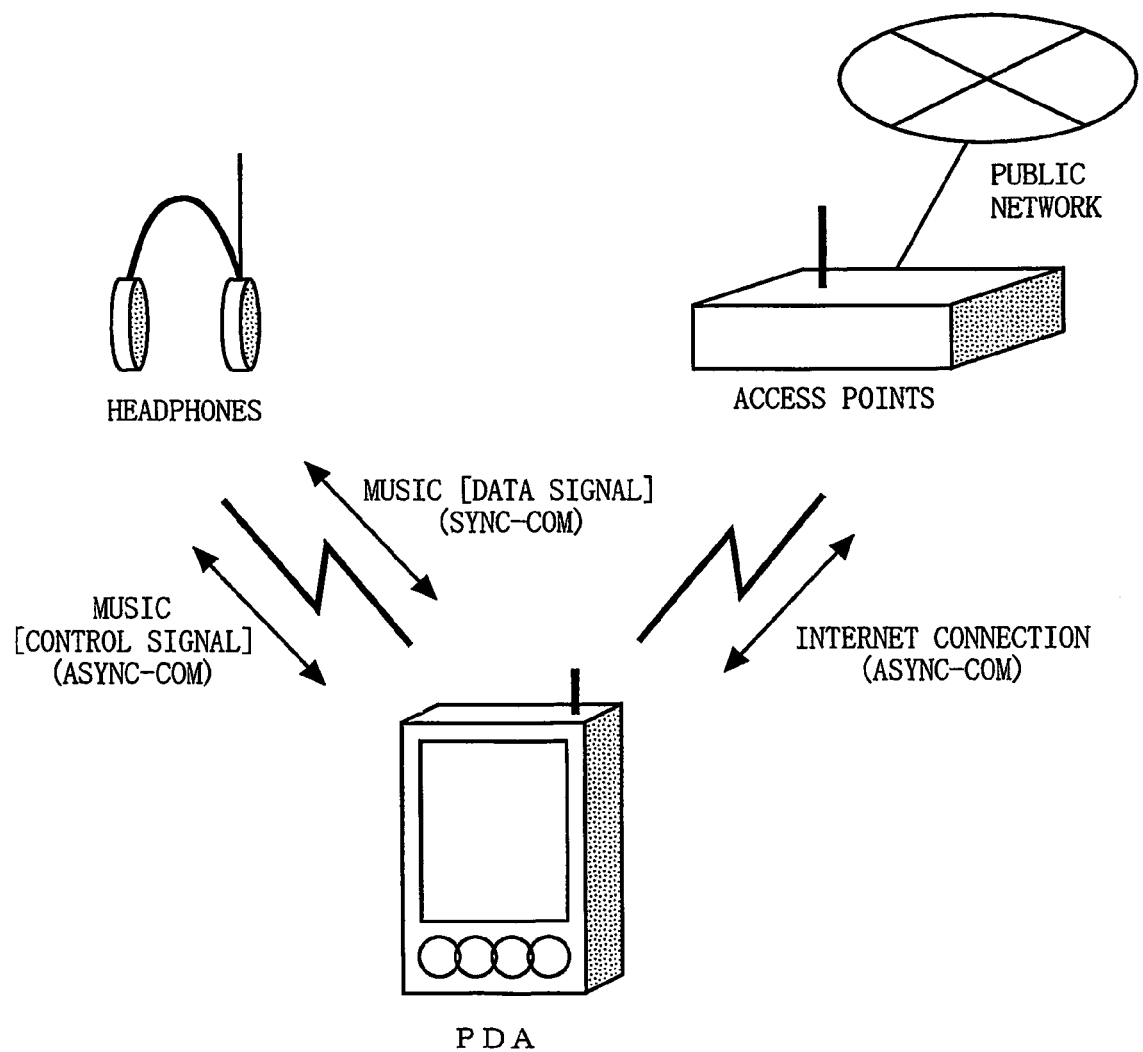
FIGS. 4 and 5 are diagrams illustrating an exemplary configuration for establishing communication links among a plurality of wireless communication terminals.
Figure 5:
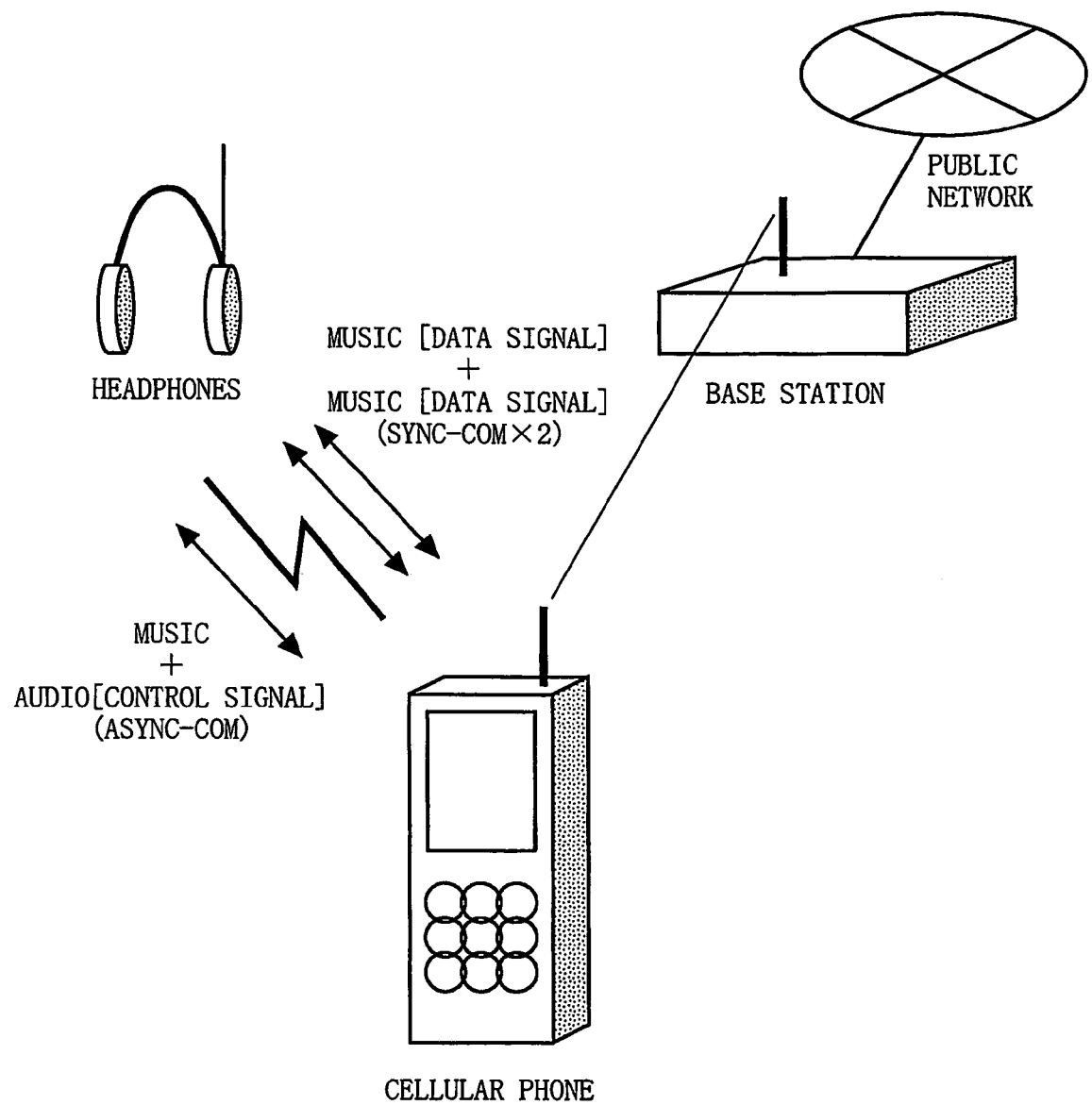
Figure 6:
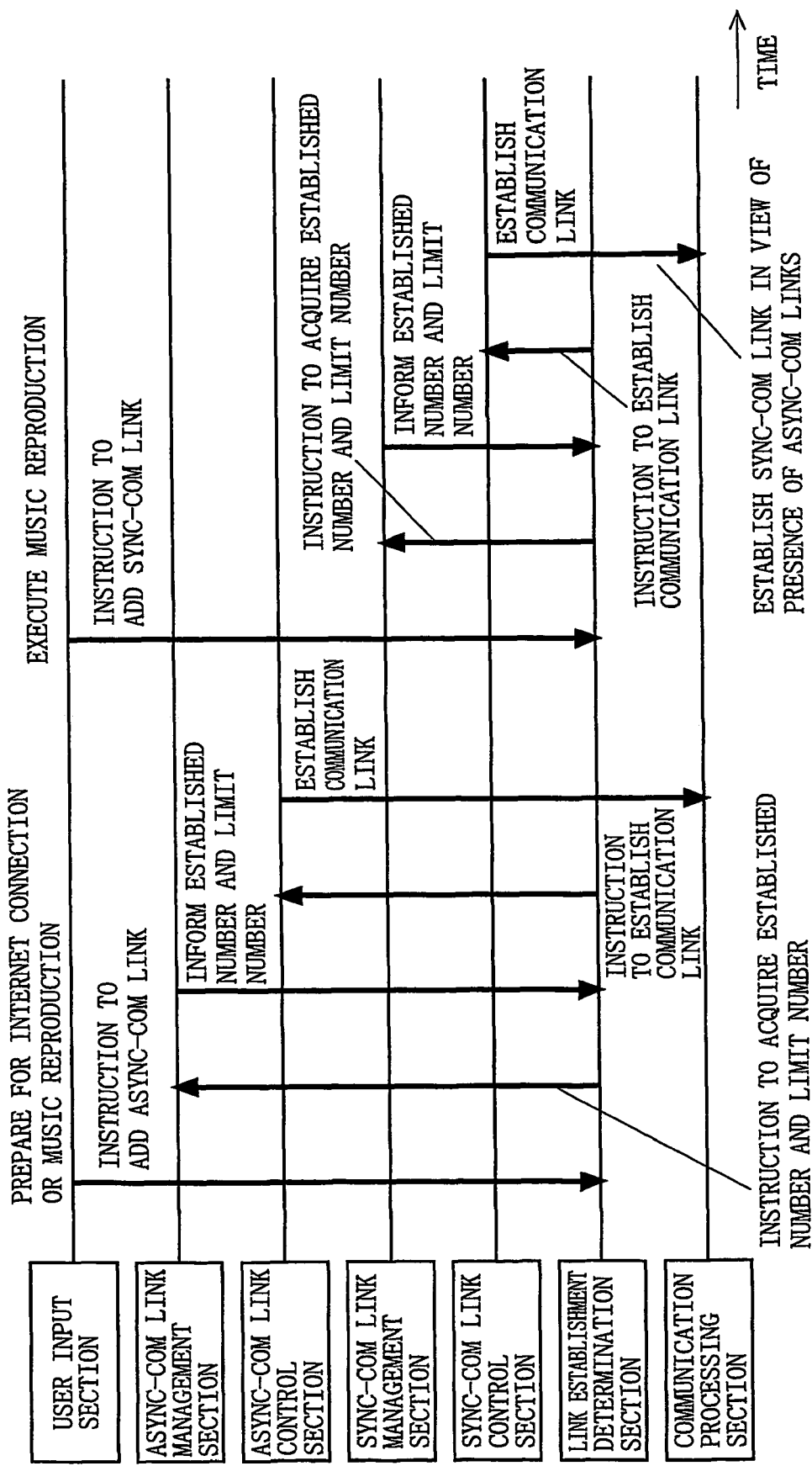
FIG. 6 is a chart illustrating a communication sequence in the case where a link can be established in the system configuration illustrated in FIG. 4.
Figure 7:
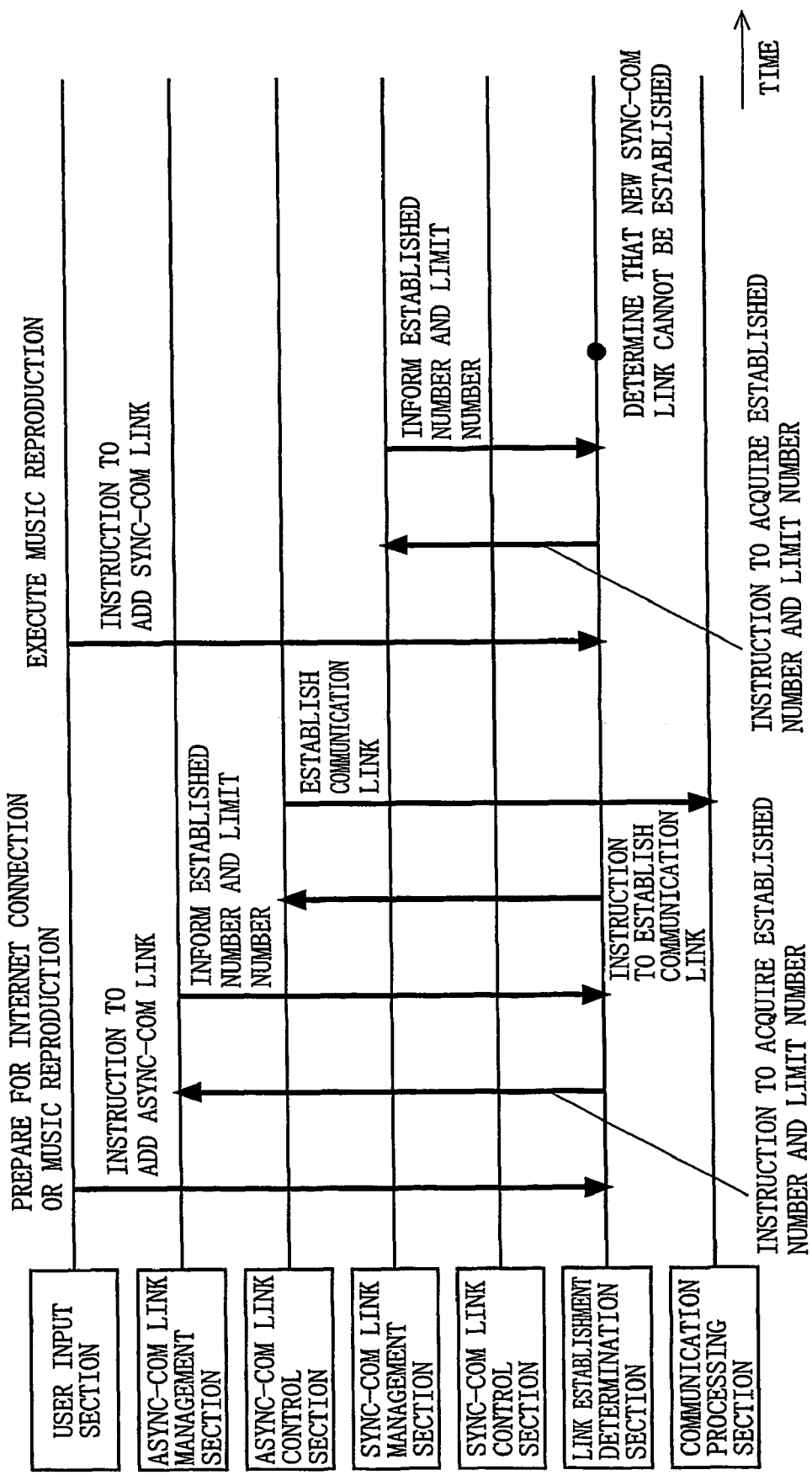
FIG. 7 is a chart illustrating a communication sequence in the case where a link cannot be established in the system configuration illustrated in FIG. 4.

Next, a procedure of establishing a synchronous communication link in accordance with the synchronous communication link establishment method illustrated in FIG. 2 will be described, with respect to a more specific configuration. FIG. 4 is a diagram illustrating an exemplary wireless communication system, where a user listens to music while accessing the Internet, using a PDA. FIG. 5 is a diagram illustrating an exemplary wireless communication system, where a user places a telephone call while listening to music, using a cellular phone. FIG. 6 is a chart illustrating a communication sequence in the case where a link can be established in the system configuration illustrated in FIG. 4. FIG. 7 is a chart illustrating a communication sequence in the case where a link cannot be established in the system configuration illustrated in FIG. 4.

When an instruction to connect to an access point for utilizing the Internet is received from the user, the user input section 10 of the PDA determines that it is an instruction to establish an asynchronous communication link, and issues, to the link establishment determination section 25, a request to establish an asynchronous communication link. Upon receiving this request, the link establishment determination section 25 acquires, from the asynchronous communication link management section 21, an established number (headphones: 0, access points: 0 in an initial state) and a limit number (=7) concerning asynchronous communication links, and acquires from the synchronous communication link management section 22 an established number (headphones: 0, access points: 0 in an initial state) and a limit number (=3) concerning synchronous communication links. Based on these values, the link establishment determination section 25 determines that the asynchronous communication link requested by the user can be established. Then, the link establishment determination section 25 issues, to the asynchronous communication link control section 23, an instruction to establish the asynchronous communication link, and updates the established number managed by the asynchronous communication link management section 21 (access points: 0→1). In response to this instruction, the asynchronous communication link control section 23 establishes an asynchronous communication link.

Next, when an instruction to connect headphones as a preparation for listening to music is received from the user, the user input section 10 of the PDA determines that it is an instruction to establish an asynchronous communication link, and issues to the link establishment determination section 25 a request to establish an asynchronous communication link. Upon receiving this request, the link establishment determination section 25 acquires from the asynchronous communication link management section 21 an established number (headphones: 0, access points: 1) and a limit number (=7) concerning asynchronous communication links, and acquires, from the synchronous communication link management section 22, an established number (headphones: 0, access points: 0) and a limit number (=3) concerning synchronous communication links. Based on these values, the link establishment determination section 25 determines that the asynchronous communication link requested by the user can be established. Then, the link establishment determination section 25 issues, to the asynchronous communication link control section 23, an instruction to establish the asynchronous communication link, and updates the established number managed by the asynchronous communication link management section 21 (headphones: 0→1). In response to this instruction, the asynchronous communication link control section 23 establishes an asynchronous communication link.

Thereafter, when an instruction to play music is received from the user, the user input section 10 of the PDA determines that it is an instruction to establish a synchronous communication link, and issues to the link establishment determination section 25 a request to establish a synchronous communication link. This request includes a packet type as a parameter. Upon receiving this request, the link establishment determination section 25 acquires from the asynchronous communication link management section 21 an established number (headphones: 1, access points: 1) and a limit number (=7) concerning a synchronous communication links, and acquires, from the synchronous communication link management section 22, an established number (headphones: 0, access points: 0) and a limit number (=3) concerning synchronous communication links. Based on these values and the packet type, the link establishment determination section 25 determines whether the synchronous communication link requested by the user can be established.

In the above scenario, the link establishment determination section 25 will determine that the synchronous communication link cannot be established if the packet type requested by the user is "HV1". On the other hand, the link establishment determination section 25 will determine that the synchronous communication link can be established if the packet type requested by the user is "HV2" or "HV3". Only when determining that the synchronous communication link can be established does the link establishment determination section 25 issue, to the synchronous communication link control section 24, an instruction to establish the synchronous communication link and update the established number managed by the synchronous communication link management section 22 (headphones: 0→1). Upon receiving this instruction, the synchronous communication link control section 24 establishes a synchronous communication link.

Thus, in accordance with the wireless communication terminal and the communication link establishment method of the first embodiment of the present invention, the presence of asynchronous communication links and the presence/status of synchronous communication links between wireless communication terminals are both considered in determining whether or not to permit a synchronous communication link to be established at the requested communication quality. In particular, if there is any wireless communication terminal (other than the wireless communication terminal with which to newly establish the requested synchronous communication link) that has established an asynchronous communication link alone, it is determined, based on the presence/status of both synchronous and asynchronous communication links, as to whether all of the synchronous communication links having been established will not use up the entire communication band. Thus, even if a request to establish a new synchronous communication link is made, it is ensured that the currently-established asynchronous communication links will always be maintained.

Second Embodiment

In the first embodiment above, the link establishment determination section 25 determines whether or not a new synchronous communication link can be established while complying with the communication quality requested by the user. Therefore, according to the first embodiment, there may be a situation where a new synchronous communication link is denied for failing to satisfy the requested communication quality, even if it could be established at a poorer communication quality.

Accordingly, the second embodiment will provide a method of establishing a synchronous communication link at a communication quality which is regarded as optimum when a link establishment determination is made, irrespective of the communication quality requested by the user.

Figure 8:
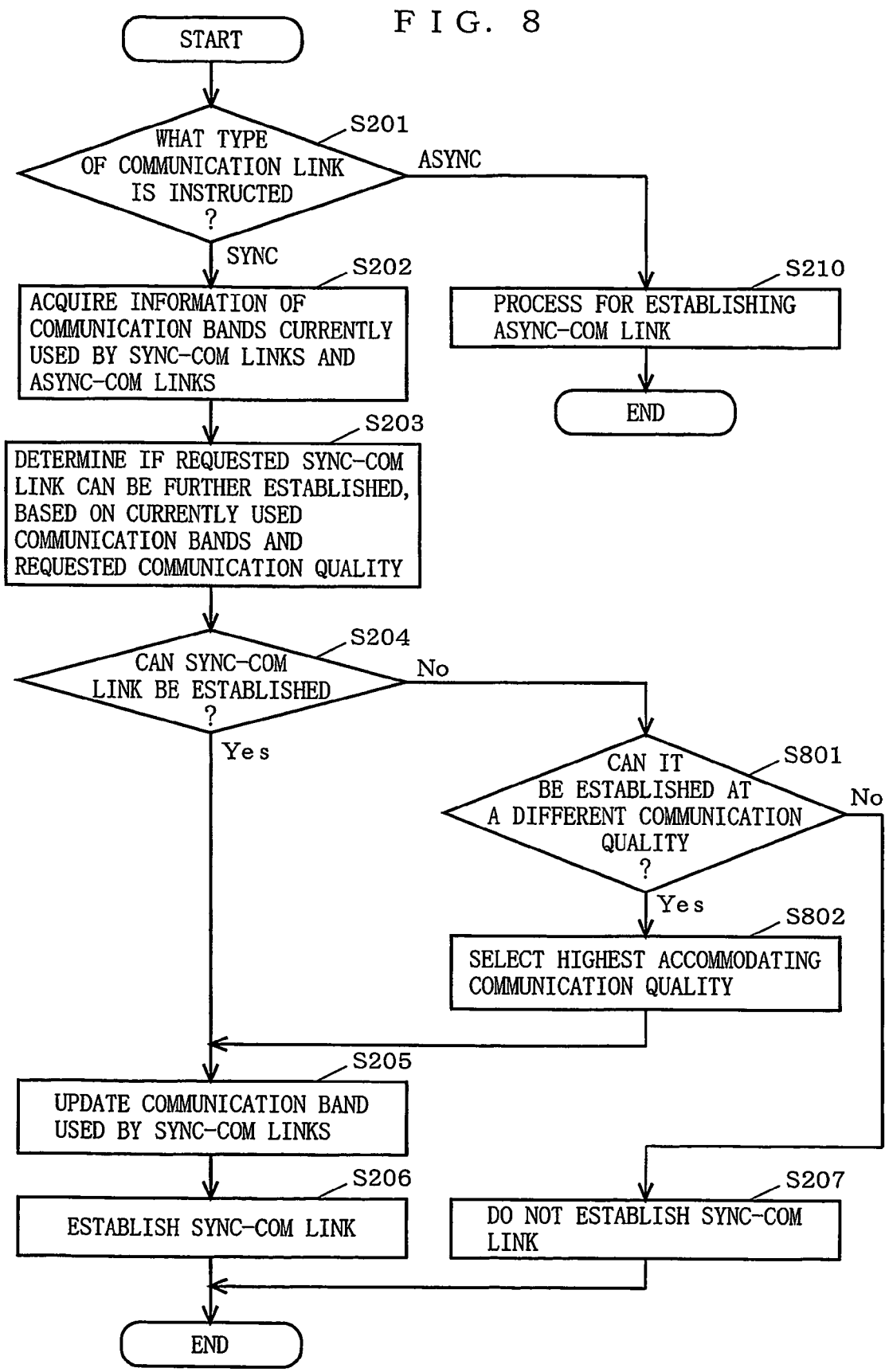
FIG. 8 is a flowchart illustrating the procedure of a communication link establishment method according to the second embodiment of the present invention.

The wireless communication terminal according to the second embodiment of the present invention has the same fundamental structure as that in the first embodiment as shown in FIG. 1, except that the link establishment determination section 25 performs a different process. Hereinafter, the second embodiment will be described mainly with respect to this difference. FIG. 8 is a flowchart illustrating the procedure of a communication link establishment method according to the second embodiment of the present invention. In FIG. 8, any steps which pertain to the same processes as those shown in FIG. 2 are denoted by like numerals.

Based on the communication band used by synchronous communication links and the communication band used by asynchronous communication links as well as the requested communication quality, the link establishment determination section 25 determines whether the newly-requested synchronous communication link can be established while maintaining the currently-established asynchronous communication links (step S203). If it is determined that the new synchronous communication link can be established (following the "YES" path from step S204), a process similar to that described in the first embodiment is performed. If it is determined that the new synchronous communication link cannot be established (following the "NO" path from step S204), the link establishment determination section 25 then confirms whether the synchronous communication link can be established at a different communication quality (hereinafter, such a communication quality will be referred to as an "accommodating communication quality") (step S801). If it is found that the synchronous communication link can be established at a number of other communication qualities, the link establishment determination section 25 selects the highest communication quality from among the available communication qualities (step S802). Then, in order to establish the synchronous communication link at this selected communication quality, the link establishment determination section 25 updates the used communication band (step S205), and the synchronous communication link control section 24 establishes a communication link (step S206). If no accommodating communication quality can be found, the process is ended without establishing the requested synchronous communication link (step S207).

For example, in Bluetooth communications, a better communication quality is provided (i.e., a broader communication band is used) in the order of packet types HV1>HV2>HV3 (see the aforementioned Bluetooth guidelines). Taking the aforementioned state [1] in FIG. 3, for example, although a synchronous communication link based on HV1 packets cannot be established in this state, a synchronous communication link based on HV2 packets or HV3 packets could still be established. Therefore, in the present embodiment, if the communication quality requested by the user is "HV1", the link establishment determination section 25 will select a synchronous communication link based on HV2 packets.

Thus, in accordance with the wireless communication terminal and the communication link establishment method of the second embodiment of the present invention, the presence of asynchronous communication links and the presence/status of synchronous communication links between wireless communication terminals are both considered in determining whether or not to permit a synchronous communication link to be established at the requested communication quality or at a different communication quality. Thus, even if a request to establish a new synchronous communication link is made, it is ensured that the currently-established asynchronous communication links will always be maintained. Moreover, the second embodiment can permit more synchronous communication links to be established than in the first embodiment.

Third Embodiment

The second embodiment above illustrates a method which controls establishment of a synchronous communication link based on a communication quality different from a communication quality requested by the user. In other words, it is determined whether a new synchronous communication link can be established by using an unused portion of the communication band.

According to a third embodiment of the present invention, there is provided a method which, if another synchronous communication link(s) is already established, optimizes the communication qualities of all synchronous communication links so as to permit a plurality of synchronous communication links to be established throughout the entire communication band, rather than exploiting only the unused portion of the communication band.

The wireless communication terminal according to the third embodiment of the present invention has the same fundamental structure as that in the first or second embodiment as shown in FIG. 1, except that the link establishment determination section 25 performs a different process. Hereinafter, the third embodiment will be described mainly with respect to this difference.

Figure 9:
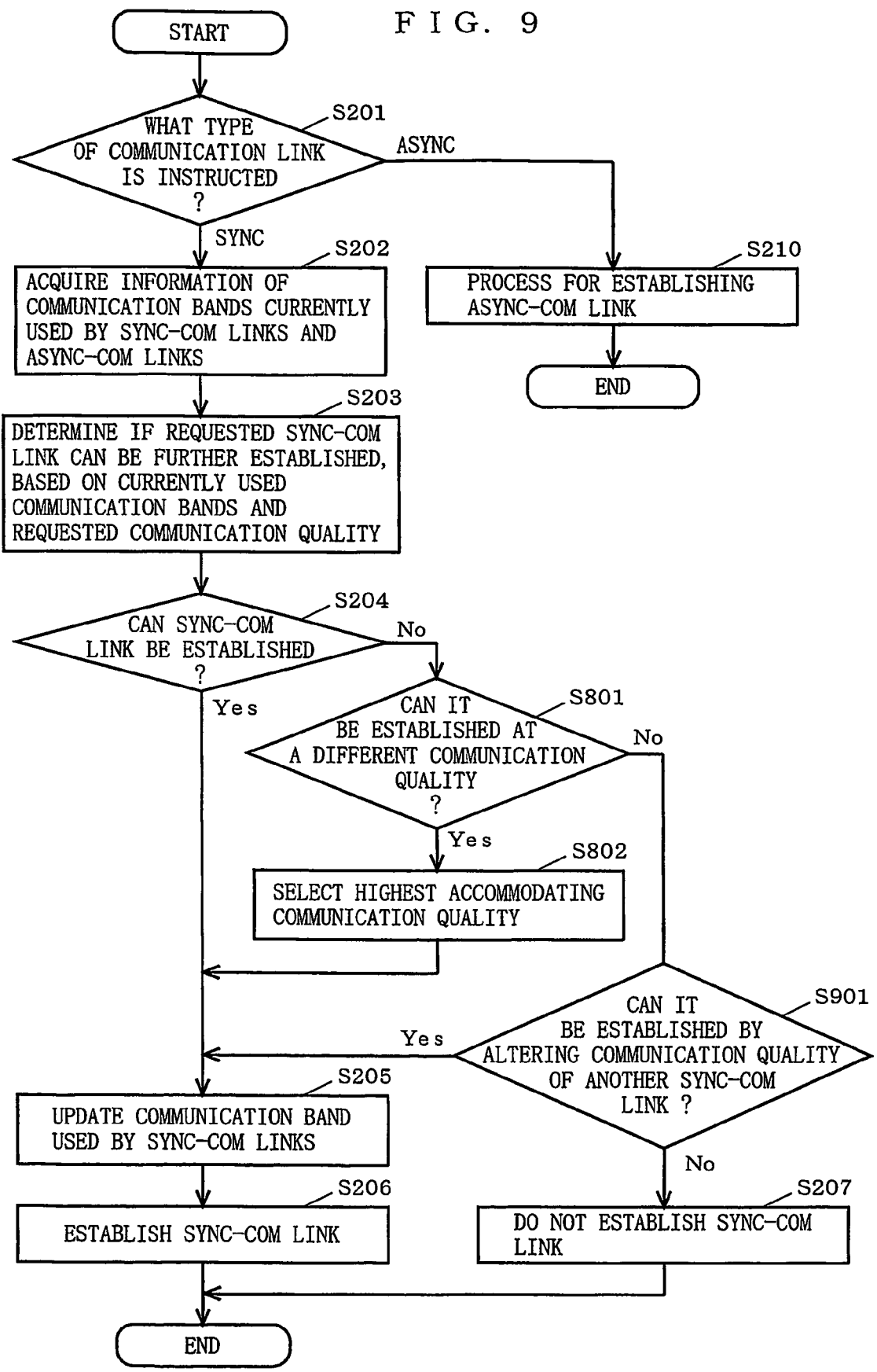
FIG. 9 is a flowchart illustrating the procedure of a communication link establishment method according to the third embodiment of the present invention.

FIG. 9 is a flowchart illustrating the procedure of a communication link establishment method according to the third embodiment of the present invention. In FIG. 9, any steps which pertain to the same processes as those shown in FIG. 2 or 8 are denoted by like numerals.

Based on the communication band used by synchronous communication links and the communication band used by asynchronous communication links as well as the requested communication quality, if it is determined that a synchronous communication link cannot be established, then the link establishment determination section 25 confirms whether the synchronous communication link can be established at a different communication quality (step S801). If it is found that the synchronous communication link can be established at a number of other communication qualities, the link establishment determination section 25 selects the highest communication quality among them (step S802). Then, in order to establish the synchronous communication link at this selected communication quality, the link establishment determination section 25 updates the used communication band (step S205), and the synchronous communication link control section 24 establishes a communication link (step S206).

On the other hand, if it is found that the synchronous communication link cannot be established at any other communication quality either, the link establishment determination section 25 then determines whether, by altering the communication quality of another already-established synchronous communication link, it becomes possible to establish the new synchronous communication link along with the synchronous communication link whose communication quality has been thus altered (step S901). If such is possible, the link establishment determination section 25 instructs the synchronous communication link control section 24 to establish the new synchronous communication link and reestablish the other synchronous communication link at the altered communication quality. In accordance with these instructions to establish synchronous communication links, the link establishment determination section 25 updates the communication band used by synchronous communication links (i.e., the established number) which is managed by the synchronous communication link management section 22 (step S205). The synchronous communication link control section 24 establishes synchronous communication links as instructed (step S206).

For example, with respect to the aforementioned state [2] in FIG. 3, a synchronous communication link is already established based on HV2 packets, thereby making it impossible to establish a synchronous communication link based even on HV3 packets, much less HV2 packets. However, by altering this already-established synchronous communication link to that based on HV3 packets, it becomes possible to newly establish a synchronous communication link based on HV3 packets. As a result, two synchronous communication links based on HV3 packets will be established in this case.

Thus, in accordance with the wireless communication terminal and the communication link establishment method of the third embodiment of the present invention, the presence of asynchronous communication links and the presence/status of synchronous communication links between wireless communication terminals are both considered in determining whether or not to permit a synchronous communication link to be established at the requested communication quality or at a different communication quality. Furthermore, the communication quality of an already-established synchronous communication link is dynamically altered. Thus, even if a request to establish a new synchronous communication link is made, it is ensured that the currently-established asynchronous communication links will always be maintained. Moreover, the third embodiment can permit more synchronous communication links to be established than in the second embodiment.

If any of the synchronous communication links is released after a plurality of synchronous communication links are established according to the above control method, then a communication quality improvement may be obtained by performing the following process. If the newly-established synchronous communication link is released first, then the communication quality of the already-established synchronous communication link can be brought back to the original communication quality. On the other hand, if the already-established synchronous communication link is released first, then the communication quality of the newly-established synchronous communication link can be brought back to the originally requested communication quality. For instance, if one of the two HV3 packet-based synchronous communication links in the aforementioned example is released, then the other synchronous communication link may be altered to that based on HV2 packets.

Fourth Embodiment

The second embodiment above illustrates a method which automatically establishes a synchronous communication link at a communication quality which is regarded as optimum when a link establishment determination is made, irrespective of the communication quality requested by the user.

According to a fourth embodiment of the present invention, there is provided a method which presents, to the user, an accommodating communication quality(s) which is available when a link establishment determination is made, thereby allowing the user to make their own selection.

Figure 10:
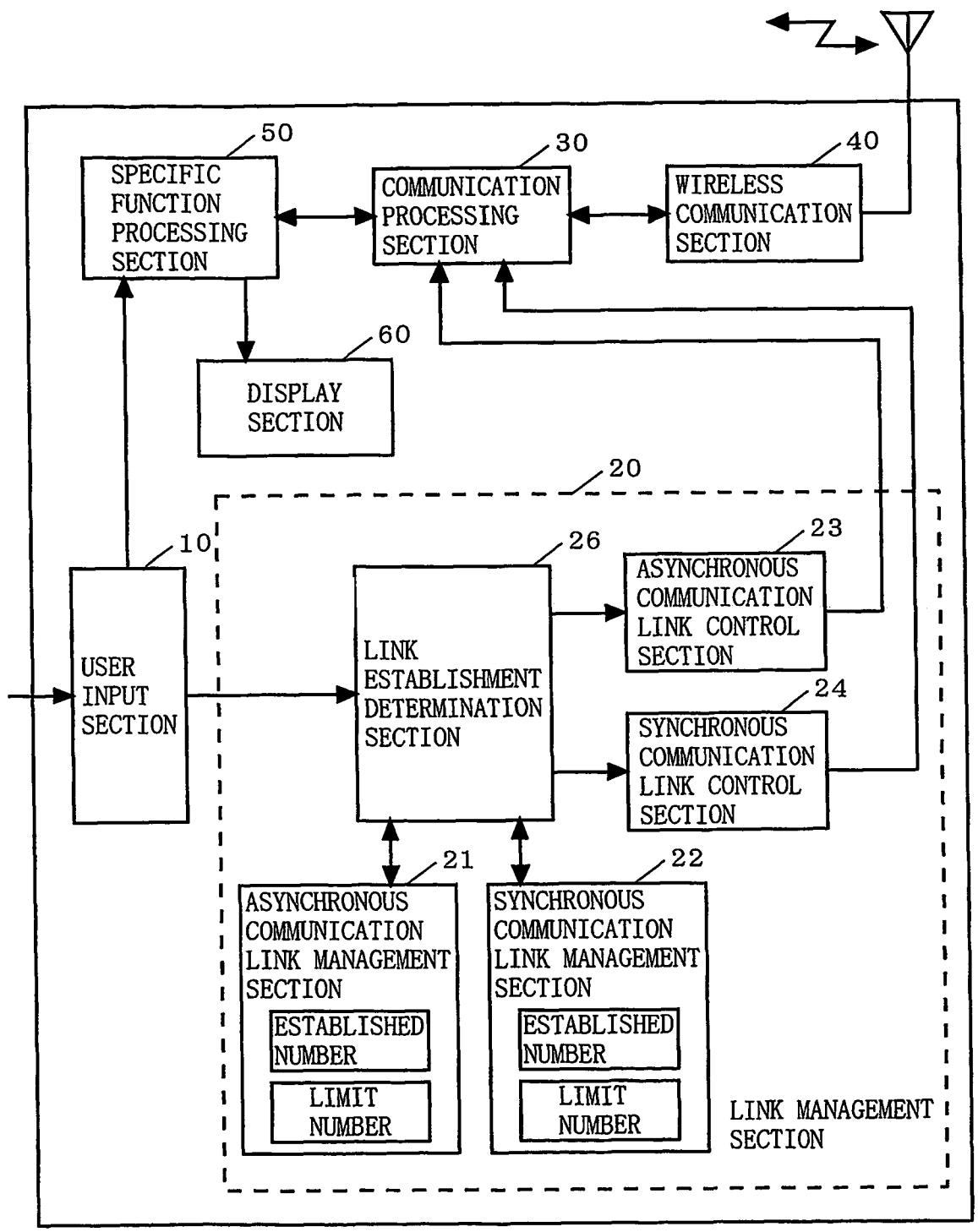
FIG. 10 is a block diagram illustrating a schematic structure of a wireless communication terminal according to a fourth embodiment of the present invention.
Figure 11:
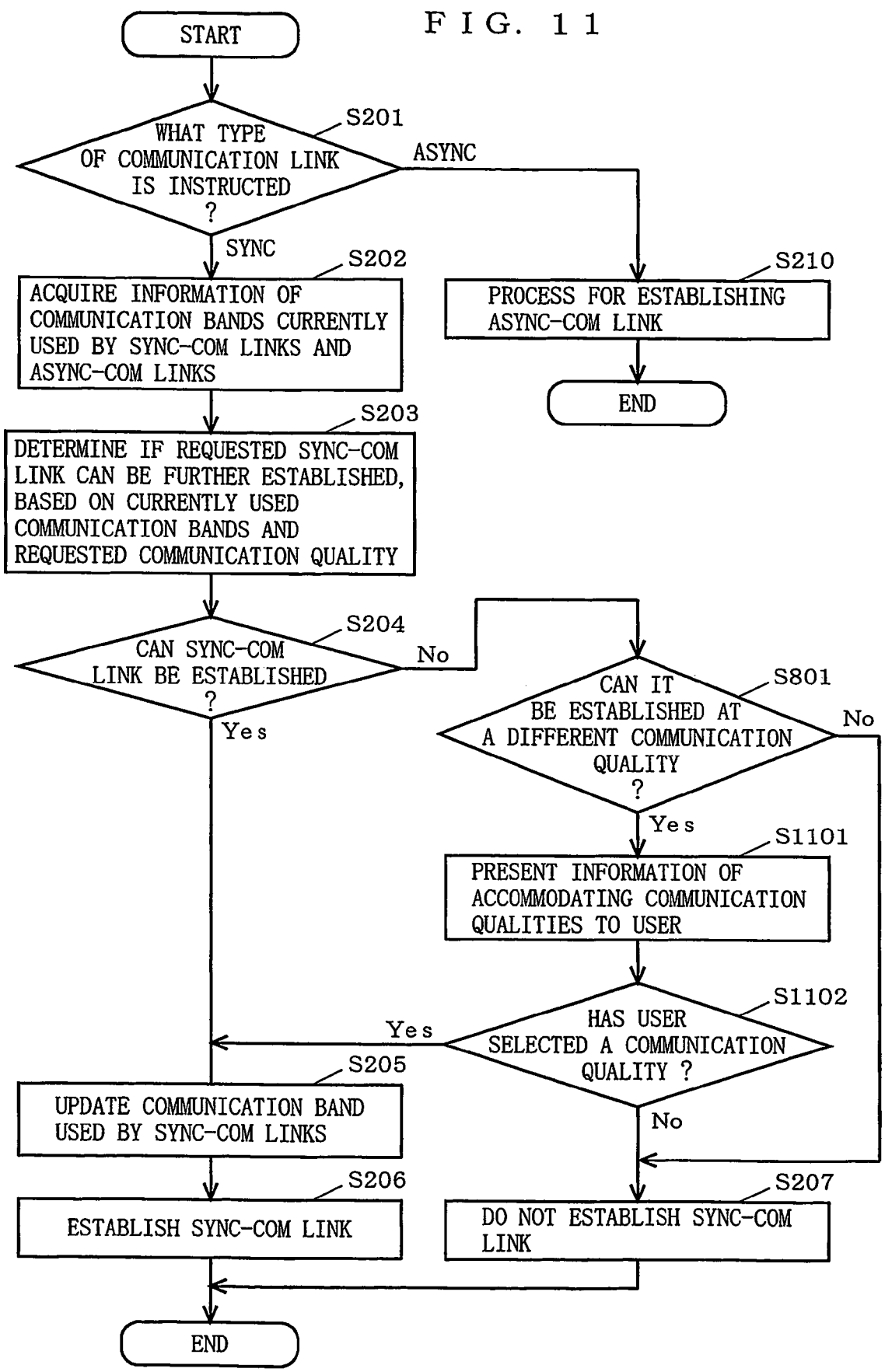
FIG. 11 is a flowchart illustrating the procedure of a communication link establishment method according to the fourth embodiment of the present invention.
Figure 12:
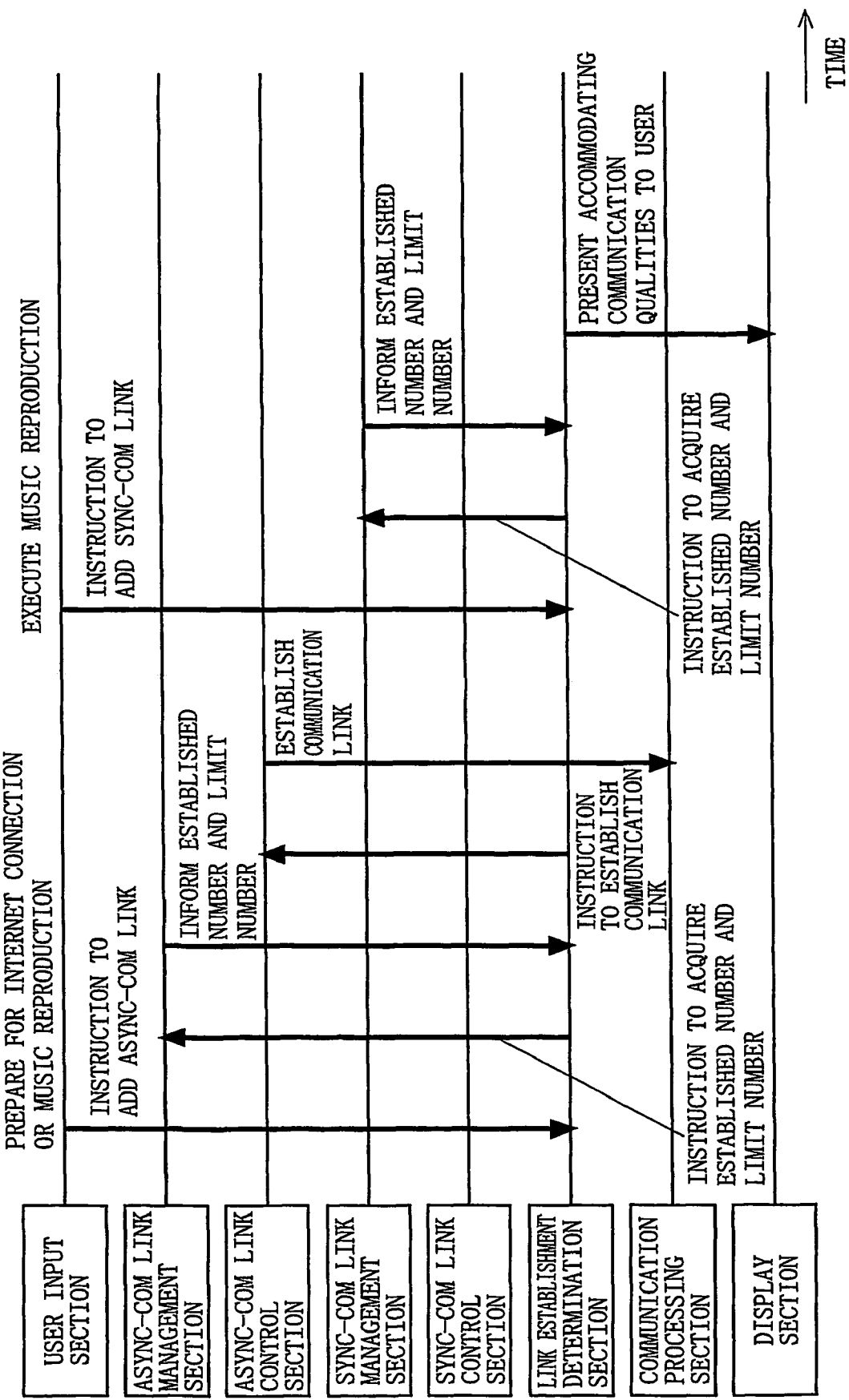
FIG. 12 is a chart illustrating a communication sequence as performed by various component elements of the wireless communication terminal according to the fourth embodiment of the present invention.

FIG. 10 is a block diagram illustrating a schematic structure of a wireless communication terminal according to the fourth embodiment of the present invention. As shown in FIG. 10, the wireless communication terminal according to the fourth embodiment includes a link establishment determination section 26 instead of the link establishment determination section 25 shown in FIG. 1. Hereinafter, the fourth embodiment will be described mainly with respect to this difference. FIG. 11 is a flowchart illustrating the procedure of a communication link establishment method according to the fourth embodiment of the present invention. In FIG. 11, any steps which pertain to the same processes as those shown in FIG. 2 or 8 are denoted by like numerals. FIG. 12 is a chart illustrating a communication sequence as performed by various component elements of the wireless communication terminal according to the fourth embodiment of the present invention.

The link establishment determination section 26 determines whether the currently-established communication link(s) can be maintained even if the newly-requested communication link is established, based on (i) the communication band (currently used by asynchronous communication links) as managed by the asynchronous communication link management section 21, (ii) the communication band (currently used by synchronous communication links) as managed by the synchronous communication link management section 22, and (iii) the communication quality of the synchronous communication link which has been requested to be established. If it is determined that the new synchronous communication link cannot be established at the communication quality requested by the user, the link establishment determination section 26 presents information concerning another communication quality(s) which will enable the establishment of the new synchronous communication link, by means of the display section 60.

Referring to FIG. 11, based on the communication band used by synchronous communication links and the communication band used by asynchronous communication links as well as the requested communication quality, the link establishment determination section 26 determines whether the newly-requested synchronous communication link can be established while maintaining the currently-established asynchronous communication links (step S203). If it is determined that the new synchronous communication link can be established (following the "YES" path from step S204), a process similar to that described in the first embodiment is performed. If it is determined that the new synchronous communication link cannot be established (following the "NO" path from step S204), the link establishment determination section 26 then confirms whether the synchronous communication link can be established at a different communication quality ("accommodating communication quality") (step S801). If it is found that the synchronous communication link can be established at a number of accommodating communication qualities, then the link establishment determination section 26 extracts all such accommodating communication qualities, and presents the information concerning the accommodating communication qualities to the user, together with a message that it is impossible to establish a new synchronous communication link at the requested communication quality, by means of the display section 60 and in a predetermined format (step S1101).

Figure 13A:
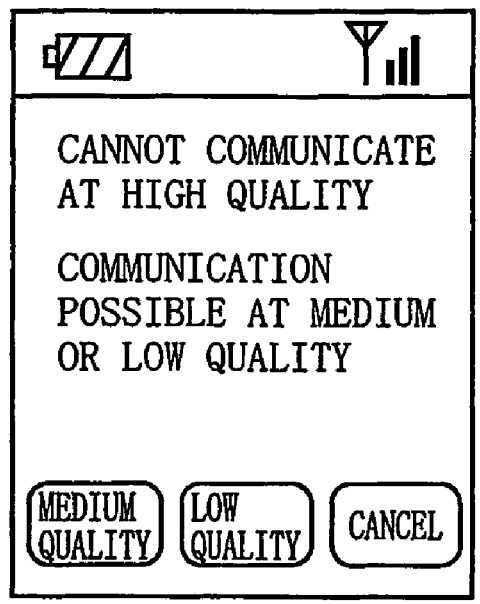
FIGS. 13A and 13B are exemplary images displayed by a display section 60, as controlled by a link establishment determination section 26.

In the aforementioned state [1] in FIG. 3, for example, although a synchronous communication link based on the requested HV1 packets cannot be established in this state, a synchronous communication link based on HV2 packets or HV3 packets could still be established. Therefore, in this case, the link establishment determination section 26 displays the determination result that a new synchronous communication link cannot be established based on HV1 packets, and the determination result that a new synchronous communication link could be established based on HV2 packets or HV3 packets on the screen of the display section 60. An example of such a displayed image is shown in FIG. 13A.

Based on this image displayed by the display section 60, the user will know that high-quality music reproduction is currently unavailable. Furthermore, the user is enabled to select whether to not play music at all or play music at a different communication quality (step S1102).

Thus, in accordance with the wireless communication terminal and the communication link establishment method of the fourth embodiment of the present invention, the presence of asynchronous communication links and the presence/status of synchronous communication links between wireless communication terminals are both considered in determining whether or not to permit a synchronous communication link to be established at the requested communication quality or at a different communication quality. Furthermore, if a new synchronous communication link cannot be established at a communication quality requested by the user, then information concerning a different communication quality(s) which will enable the establishment is presented to the user. Thus, it is possible to control establishment of synchronous communication links in such a manner as to reflect the user's intention, while ensuring that the currently-established asynchronous communication links will always be maintained.

Figure 13B:
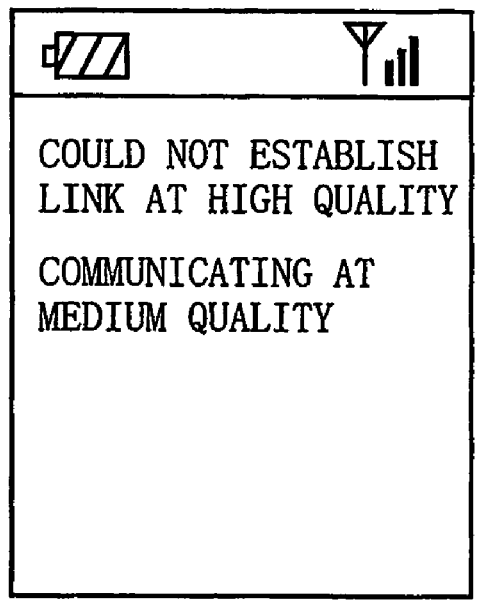
Figure 14:
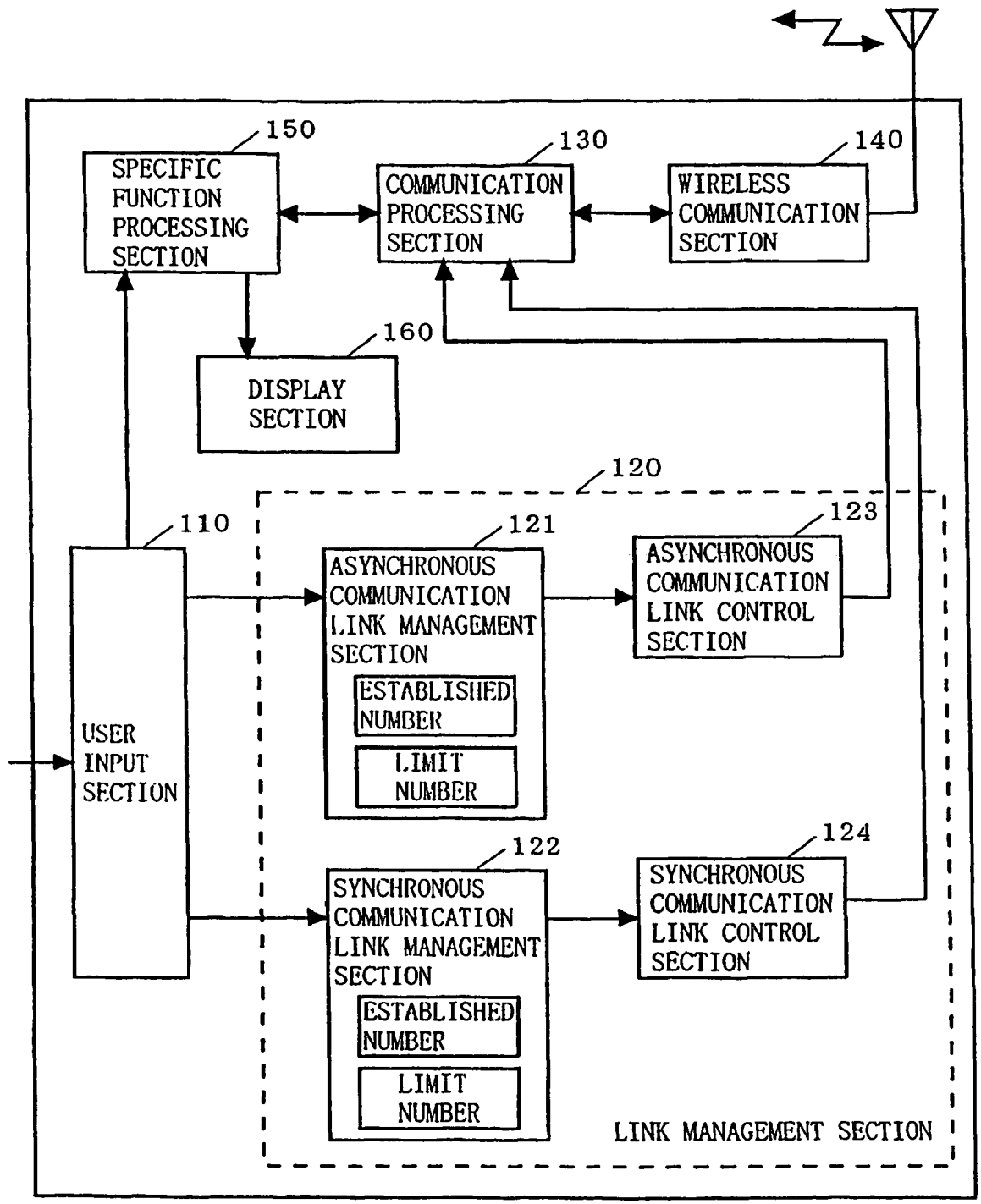
FIG. 14 is a block diagram illustrating a schematic structure of a conventional wireless communication terminal.
Figure 15:
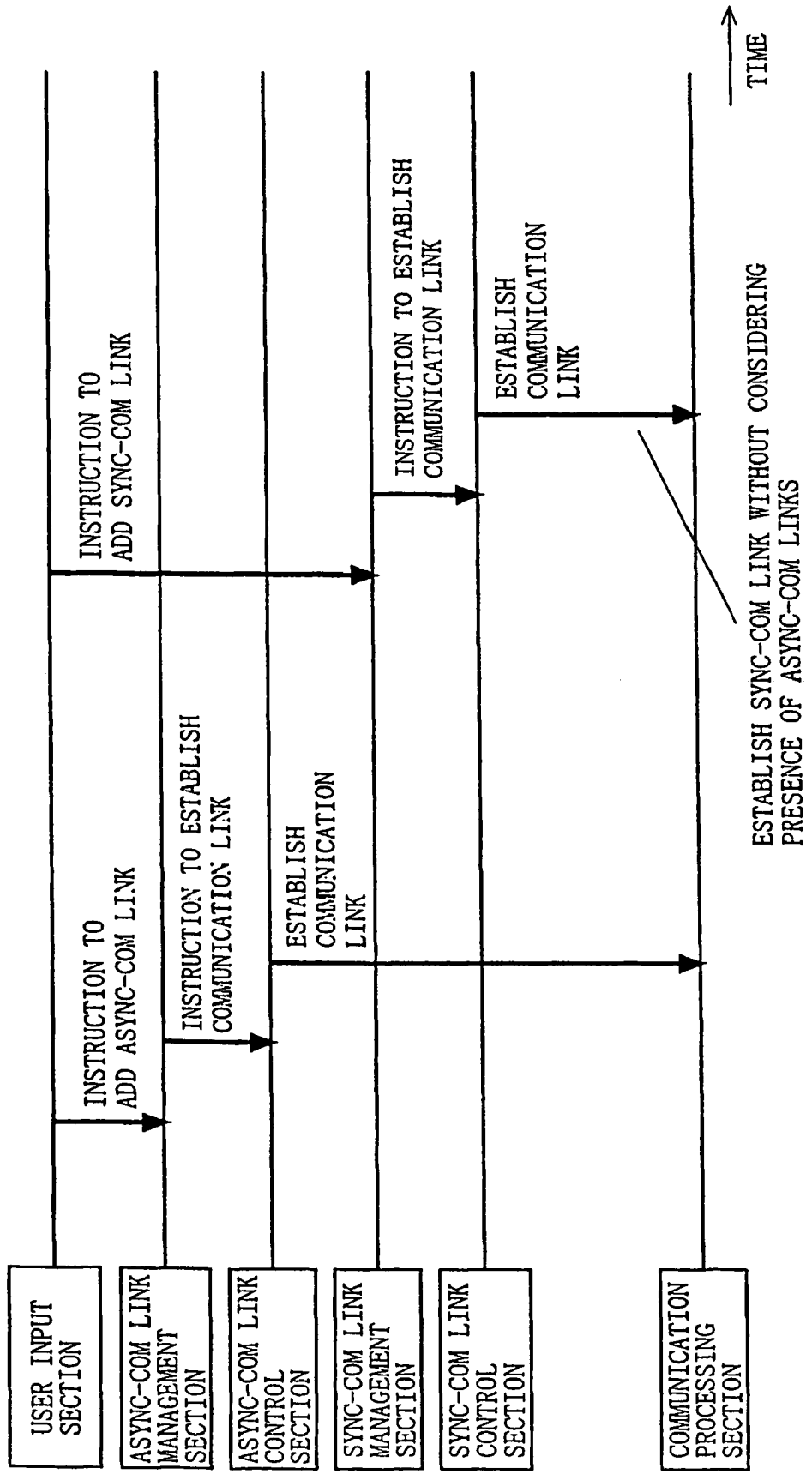
FIG. 15 is a chart illustrating a communication sequence as performed by various component elements of a conventional wireless communication terminal.

The fourth embodiment illustrates an example where accommodating communication qualities, as defined above, are displayed on the display section 60 so as to enable the user to make a selection. In another example, which will not allow the user to make their own selection, the communication quality at which a new synchronous communication link has successfully been established may be displayed, as exemplified in FIG. 13B. It will also be appreciated that, instead of combining the second embodiment with an information displaying process as in the fourth embodiment above, such an information displaying process may be combined with the link establishment technique of the third embodiment.

Typically, the communication link establishment method performed by the wireless communication terminal according to any of the first to fourth embodiments above is realized by a CPU which interprets and executes predetermined program data for implementing the above-described procedures, which may be stored in a storage device (e.g., a ROM, a RAM, or a hard disk). In this case, the program data may be introduced into such a storage device in the form of a recording medium (e.g., a CD-ROM or a flexible disk), or may be executed directly from the recording medium.

The wireless communication terminal and the communication link establishment method according to the present invention will be useful for concurrently establishing a plurality of communication links between a plurality of wireless communication terminals and the like, in the case where it is desirable to maintain the already-established asynchronous communication link(s) when a new synchronous communication link is requested, for example.

The invention claimed is:

1. A wireless communication terminal having an ability to perform asynchronous communications and perform synchronous communications using different communication bands depending on a communication quality, the wireless communication terminal being capable of concurrently establishing a plurality of communication links with a plurality of other wireless communication terminals, the wireless communication terminal comprising:
   an asynchronous communication link management section operable to manage an asynchronous communication band used by an asynchronous communication link which is already established with any other wireless communication terminal;
   a synchronous communication link management section operable to manage a synchronous communication band used by a synchronous communication link which is already established with any other wireless communication terminal;
   a link establishment determination section operable to determine, in response to a request to establish a new synchronous communication link, whether the new synchronous communication link can be established at a requested communication quality without disrupting the already-established asynchronous communication link, based on the asynchronous communication band and the synchronous communication band; and
   a link establishment section operable to establish the new synchronous communication link if the link establishment determination section determines that the new synchronous communication link can be established at the requested communication quality without disrupting the already-established asynchronous communication link.

2. The wireless communication terminal according to claim 1, wherein:
   if it is determined that the new synchronous communication link cannot be established at the requested communication quality, then the link establishment determination section is operable to further determine whether the new synchronous communication link can be established at another communication quality; and
   the link establishment section is operable to establish the new synchronous communication link at the other communication quality if the link establishment determination section determines that the new synchronous communication link can be established at the other communication quality.

3. The wireless communication terminal according to claim 2, wherein:
   if it is determined that the new synchronous communication link cannot be established at the other communication quality, then the link establishment determination section is operable to further determine whether the new synchronous communication link can be established by altering the communication quality of the already-established synchronous communication link; and
   the link establishment section is operable to establish the new synchronous communication link and reestablish the already-established synchronous communication link at an altered communication quality if the link establishment determination section determines that the new synchronous communication link can be established by altering the communication quality of the already-established synchronous communication link.

4. The wireless communication terminal according to claim 2, wherein, if it is determined that the new synchronous communication link can be established at a plurality of other communication qualities, then the link establishment determination section is further operable to present information concerning the plurality of other communication qualities to a user, thereby allowing the user to select one of the plurality of other communication qualities.

5. The wireless communication terminal according to claim 1, wherein:
- if one of a plurality of already-established synchronous communication links is released, then the link establishment determination section is operable to determine whether the remaining synchronous communication link or links can be reestablished at a communication quality which is higher than a current communication quality; and
- if the link establishment determination sections determines that the remaining synchronous communication link or links can be reestablished at a communication quality which is higher than the current communication quality, then the link establishment section is operable to reestablish the remaining synchronous communication link or links at the higher communication quality.

6. The wireless communication terminal according to claim 1, wherein the communication quality is determined based on a packet type used for each communication link.

7. The wireless communication terminal according to claim 6, wherein a plurality of packet types are available, each packet type occupying a different communication band.

8. A communication link establishment method performed by a wireless communication terminal having an ability to perform asynchronous communications and perform synchronous communications using different communication bands depending on a communication quality, the wireless communication terminal being capable of concurrently establishing a plurality of communication links with a plurality of other wireless communication terminals, the communication link establishment method comprising:
- managing an asynchronous communication band used by an asynchronous communication link which is already established with any other wireless communication terminal;
- managing a synchronous communication band used by a synchronous communication link which is already established with any other wireless communication terminal;
- determining, in response to a request to establish a new synchronous communication link, whether the new synchronous communication link can be established at a requested communication quality without disrupting the already-established asynchronous communication link, based on the asynchronous communication band and the synchronous communication band; and
- establishing the new synchronous communication link if it is determined in the determining that the new synchronous communication link can be established at the requested communication quality without disrupting the already-established asynchronous communication link.

9. A computer-readable recording medium having recorded thereon a computer program to be executed by a wireless communication terminal having an ability to perform asynchronous communications and perform synchronous communications using different communication bands depending on a communication quality, the wireless communication terminal being capable of concurrently establishing a plurality of communication links with a plurality of other wireless communication terminals, wherein the computer program causes the wireless communication terminal to perform a method comprising:
- managing an asynchronous communication band used by an asynchronous communication link which is already established with any other wireless communication terminal;
- managing a synchronous communication band used by a synchronous communication link which is already established with any other wireless communication terminal;
- determining, in response to a request to establish a new synchronous communication link, whether the new synchronous communication link can be established at a requested communication quality without disrupting the already-established asynchronous communication link, based on the asynchronous communication band and the synchronous communication band; and
- establishing the new synchronous communication link if it is determined in the step of determining that the new synchronous communication link can be established at the requested communication quality without disrupting the already-established asynchronous communication link.

* * * * *

UNITED STATES PATENT AND TRADEMARK OFFICE
CERTIFICATE OF CORRECTION

PATENT NO.          : 7,391,749 B2                                          Page 1 of 1
APPLICATION NO.  : 10/515268
DATED                  : June 24, 2008
INVENTOR(S)         : Yoshitaka Arase et al.

It is certified that error appears in the above-identified patent and that said Letters Patent is hereby corrected as shown below:

IN THE CLAIMS

In column 20, line 44, please change "determined in the step of determining" to --determined in the determining--.

Signed and Sealed this

Seventh Day of October, 2008

JON W. DUDAS
*Director of the United States Patent and Trademark Office*